(12) United States Patent
Rasal et al.

(10) Patent No.: US 11,609,700 B2
(45) Date of Patent: Mar. 21, 2023

(54) PACING IN A STORAGE SUB-SYSTEM

(71) Applicant: MELLANOX TECHNOLOGIES, LTD., Yokneam (IL)

(72) Inventors: Shridhar Rasal, Pune (IN); Laxman Kumar Dewangan, Hyderabad (IN); Oren Duer, Kohav Yair (IL); Eliav Bar-Ilan, Or Akiva (IL); Leslin Varghese, Madakkathara (IN); Prateek Patel, Indore (IN); Karem Kobti, Kafr Yasif (IL); Krishna Kishore Yarlagadda, Hyderabad (IN)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/505,670

(22) Filed: Oct. 20, 2021

(65) Prior Publication Data

US 2023/0052614 A1    Feb. 16, 2023

(30) Foreign Application Priority Data

Aug. 11, 2021    (IN) .............................. 202141036276

(51) Int. Cl.
*G06F 11/07*    (2006.01)
*G06F 3/06*    (2006.01)

(52) U.S. Cl.
CPC ............ *G06F 3/0619* (2013.01); *G06F 3/064* (2013.01); *G06F 3/0635* (2013.01);
(Continued)

(58) Field of Classification Search
CPC ............. G06F 11/0757; G06F 11/0772; G06F 3/0619; G06F 3/0635; G06F 3/064
See application file for complete search history.

(56) References Cited

U.S. PATENT DOCUMENTS 4,383,295 A    5/1983    Miller et al.
4,680,703 A    7/1987    Kriz
(Continued)

OTHER PUBLICATIONS

PCI Express® Base Specification,Revision 3.0, pp. 1-860, Nov. 10, 2010.
(Continued)

*Primary Examiner* — Nadeem Iqbal
(74) *Attorney, Agent, or Firm* — Kligler & Associates Patent Attorneys Ltd

(57) ABSTRACT

One embodiment includes data communication apparatus including a storage sub-system to be connected to storage devices, and processing circuitry to manage transfer of content with the storage devices over the storage sub-system responsively to content transfer requests, while pacing commencement of serving of respective ones of the content transfer requests responsively to availability of spare data capacity of the storage sub-system, find a malfunctioning storage device currently assigned a given data capacity of the storage sub-system and currently assigned to serve at least one content transfer request, and reallocate the given data capacity of the storage sub-system currently assigned to the malfunctioning storage device for use by at least another one of the storage devices while the at least one content transfer request assigned to be served by the malfunctioning storage device is still awaiting completion by the malfunctioning storage device.

20 Claims, 14 Drawing Sheets

(52) U.S. Cl.
CPC .......... *G06F 3/0659* (2013.01); *G06F 3/0683* (2013.01); *G06F 11/0757* (2013.01); *G06F 11/0772* (2013.01)

(56) References Cited

U.S. PATENT DOCUMENTS

| | | | |
|---|---|---|---|
| 5,913,226 | A | 6/1999 | Sato |
| 6,112,261 | A | 8/2000 | Simms et al. |
| 6,490,647 | B1 | 12/2002 | Batchelor |
| 7,409,505 | B2 | 8/2008 | Scott et al. |
| 7,721,049 | B2 | 5/2010 | Ehrlich |
| 7,886,182 | B1 | 2/2011 | Coatney et al. |
| 8,429,315 | B1 | 4/2013 | Chudgar et al. |
| 8,782,348 | B2 | 7/2014 | Eddy et al. |
| 8,954,631 | B2 * | 2/2015 | Ayyagari ............ G06F 11/3051 713/1 |
| 9,104,582 | B1 | 8/2015 | Mukundan |
| 9,525,734 | B2 | 12/2016 | Izenberg et al. |
| 9,645,931 | B2 | 5/2017 | Cox |
| 9,645,932 | B1 | 5/2017 | Bono |
| 9,678,871 | B2 | 6/2017 | Voigt |
| 9,973,417 | B2 | 5/2018 | Underwood et al. |
| 10,021,209 | B2 * | 7/2018 | Ionescu ............... H04L 67/1097 |
| 10,042,750 | B2 | 8/2018 | Roberts et al. |
| 10,082,965 | B1 * | 9/2018 | Tamilarasan .......... G06F 3/0688 |
| 10,084,716 | B2 | 9/2018 | Gafni |
| 10,248,610 | B2 | 4/2019 | Menachem et al. |
| 10,303,647 | B2 | 5/2019 | Menachem et al. |
| 10,372,551 | B2 * | 8/2019 | Milton ................ G06F 11/0793 |
| 10,397,362 | B1 | 8/2019 | Volpe et al. |
| 10,402,091 | B1 | 9/2019 | Vankamamidi et al. |
| 10,664,419 | B2 | 5/2020 | Rico Carro et al. |
| 10,733,110 | B1 | 8/2020 | Volpe |
| 10,776,272 | B2 | 9/2020 | Burstein et al. |
| 2006/0179195 | A1 | 8/2006 | Sharma et al. |
| 2006/0256784 | A1 | 11/2006 | Feng et al. |
| 2006/0259661 | A1 | 11/2006 | Feng et al. |
| 2008/0256183 | A1 | 10/2008 | Flynn et al. |
| 2008/0313364 | A1 | 12/2008 | Flynn et al. |
| 2009/0300660 | A1 | 12/2009 | Solomon et al. |
| 2010/0205367 | A1 | 8/2010 | Ehrlich et al. |
| 2011/0153952 | A1 | 6/2011 | Dixon et al. |
| 2011/0246597 | A1 | 10/2011 | Swanson et al. |
| 2013/0198311 | A1 | 8/2013 | Tamir et al. |
| 2013/0262767 | A1 | 10/2013 | Lih et al. |
| 2014/0195480 | A1 | 7/2014 | Talagala et al. |
| 2014/0258637 | A1 | 9/2014 | Hong et al. |
| 2015/0019903 | A1 | 1/2015 | Arroyo et al. |
| 2015/0067091 | A1 | 3/2015 | Das |
| 2015/0347349 | A1 | 3/2015 | Raindel et al. |
| 2016/0124877 | A1 | 5/2016 | Hefty |
| 2016/0378709 | A1 | 6/2016 | Menachem et al. |
| 2016/0337426 | A1 | 11/2016 | Shribman et al. |
| 2017/0017609 | A1 | 1/2017 | Menachem et al. |
| 2017/0034268 | A1 | 2/2017 | Govind |
| 2019/0236447 | A1 | 8/2019 | Cohen et al. |
| 2020/0050391 | A1 | 2/2020 | Meyerowitz et al. |
| 2020/0250089 | A1 | 8/2020 | Kamran et al. |
| 2021/0344600 | A1 | 11/2021 | Urman et al. |

OTHER PUBLICATIONS

Nvidia Corporation, "Nvidia GPUDirect", pp. 1-4, year 2015.
InfiniBand TM Architecture Specification vol. 1, Release 1.3, pp. 1-1842, Mar. 3, 2015.
Erickson, C., "Congestion Control", notes, pp. 1-6, May 21, 2003 downloaded from http://user.it.uu.se/~carle/Notes/32_CongestionControl.html#:~:text=Flow%20control%20is%20a%20local,and%20transport%20layers%20effect%20congestion.
Wikipedia, "TCP congestion control", pp. 1-15, last updated Oct. 19, 2020 downloaded from https://en.wikipedia.org/wiki/TCP_congestion_control.
'Nvidia BlueField-2 Ethernet DPU—User Guide—Introduction, docs.mellanox.com, pp. 1-3, year 2021, as downloaded from docs.mellanox.com/display/BlueField2DPUENUG/Introduction.
"IO Pacing Prototype," Mellanox / spdk, GitHub, Inc., pp. 1-62, Sep. 17, 2020 as downloaded from https://github.com/Mellanox/spdk/tree/io_pacing/io_pacing.
Bar-Ilan et al., U.S. Appl. No. 17/079,536, filed Oct. 26, 2020.
U.S. Appl. No. 17/079,536 Office Action dated Dec. 8, 2021.
EP Application # 22190064.0 Search Report dated Jan. 2, 2023.

* cited by examiner

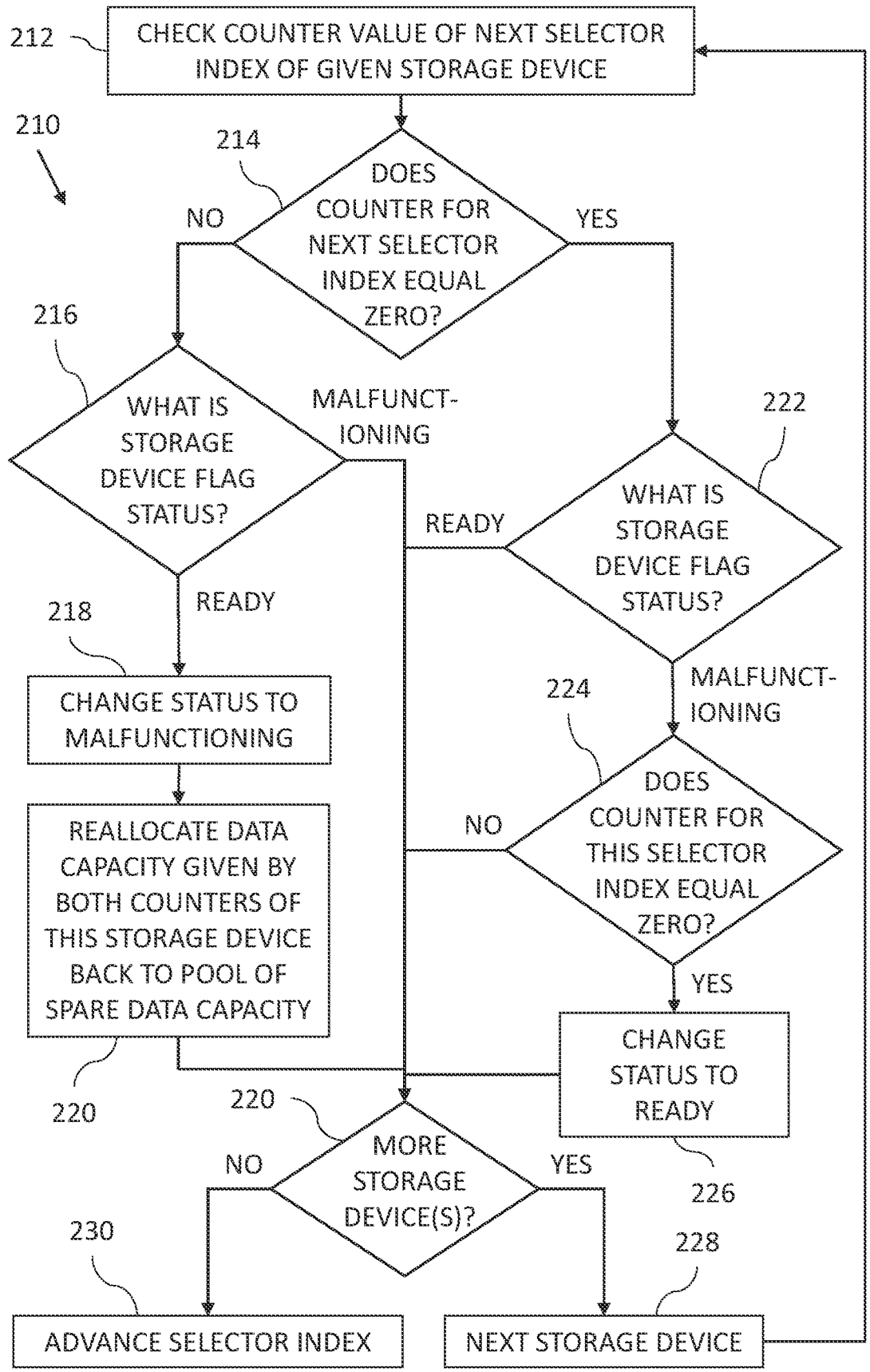

PACING IN A STORAGE SUB-SYSTEM

FIELD OF THE INVENTION

The present invention relates to computer systems, and in particular, but not exclusively to, improving input/output performance in data communication devices.

BACKGROUND

Solid-state drives (SSDs) are mass-storage devices that use integrated circuit memory, typically NAND-based flash memory, to store data while providing an interface that emulates traditional hard disk drives (HDDs). By comparison with HDDs, SSDs offer faster access, lower latency, and greater resistance to environmental disturbances. Therefore, SSDs are gradually replacing HDDs in many storage applications.

Because SSDs were originally designed to take the place of HDDs, they have generally used the same sorts of input/output (I/O) buses and protocols as HDDs, such as SATA, SAS and Fibre Channel. Subsequently, SSDs have become available that connect directly to the peripheral component interface bus of a host computer, such as the PCI Express® (PCIe®) bus. NVM Express (NVMe) defines a register interface, command set and feature set for PCI Express SSDs.

Advanced network interface controllers (NICs) are designed to support remote direct memory access (RDMA) operations, in which the NIC transfers data by direct memory access from the memory of one computer into that of another without involving the central processing unit (CPU) of the target computer. Although RDMA is generally used to transfer data to and from host memory (RAM), a number of attempts to adapt RDMA functionality for reading and writing data directly to and from an SSD have been described in the patent literature.

For example, U.S. Patent Application Publication 2008/0313364 describes a method for remote direct memory access to a solid-state storage device, which is said to allow direct access between memory of a client connected through a network to such a device. Similarly, U.S. Patent Application Publication 2011/0246597 describes a system in which a network interface component of a server may access a solid-state storage module of the server by a network storage access link that bypasses a central processing unit (CPU) and main memory of the server.

Additionally, smart NICs, such as the Mellanox® Blue-Field®-2 data processing unit, offload critical network, security, and storage tasks from the CPU, for example, by supporting RDMA operations and directly reading or writing to attached storage devices in response to remote initiators requests.

SUMMARY

There is provided in accordance with an embodiment of the present disclosure, data communication apparatus, including a storage sub-system to be connected to storage devices, and processing circuitry to manage transfer of content with the storage devices over the storage sub-system responsively to content transfer requests, while pacing commencement of serving of respective ones of the content transfer requests responsively to availability of spare data capacity of the storage sub-system so that while ones of the content transfer requests are being served, other ones of the content transfer requests pending serving are queued in at least one pending queue, find a malfunctioning storage device of the storage devices currently assigned a given data capacity of the storage sub-system and currently assigned to serve at least one of the content transfer requests, and reallocate the given data capacity of the storage sub-system currently assigned to the malfunctioning storage device for use by at least another one of the storage devices while the at least one content transfer request assigned to be served by the malfunctioning storage device is still awaiting completion by the malfunctioning storage device.

Further in accordance with an embodiment of the present disclosure the storage sub-system includes a cache, and the spare data capacity is spare cache capacity.

Still further in accordance with an embodiment of the present disclosure the processing circuitry is configured to find the malfunctioning storage device responsively to the malfunctioning storage device taking longer than a given timeout value to complete serving the at least one content transfer request.

Additionally in accordance with an embodiment of the present disclosure the processing circuitry is configured to change a status flag to indicate that the malfunctioning storage device is malfunctioning.

Moreover in accordance with an embodiment of the present disclosure the processing circuitry is configured to receive a new content transfer request while the status flag indicates that the malfunctioning storage device is malfunctioning, and commence serving of the new content transfer request, without first adding the new content transfer request to the at least one pending queue, responsively to there being enough spare data capacity of the storage sub-system to serve the new content transfer request and the new content transfer request not being associated with the malfunctioning storage device.

Further in accordance with an embodiment of the present disclosure the processing circuitry is configured to receive a new content transfer request while the status flag indicates that the malfunctioning storage device is malfunctioning, and add the new content transfer request to the at least one pending queue responsively to the new content transfer request being associated with the malfunctioning storage device.

Still further in accordance with an embodiment of the present disclosure the processing circuitry is configured to increment a counter responsively to a decision to commence serving a selected one of the content transfer requests, the counter being advanced in a first direction responsively to a length of a data block associated with the selected content transfer request, and decrement the counter responsively to completion of serving the selected content transfer request, the counter being advanced in a second direction responsively to a length of a data block associated with the selected content transfer request.

Additionally in accordance with an embodiment of the present disclosure the processing circuitry is configured to find that the malfunctioning storage device is malfunctioning and taking longer than a given timeout value to complete serving the selected content transfer request responsively to a value of the counter after a time delay from when the counter was incremented responsively to the decision to commence serving the selected content transfer request.

Moreover, in accordance with an embodiment of the present disclosure the processing circuitry is configured to operate different counters for the content transfer requests of respective different ones of the storage devices.

Further in accordance with an embodiment of the present disclosure the processing circuitry is configured to increment different counters for the content transfer requests that commence serving in different time periods.

Still further in accordance with an embodiment of the present disclosure the processing circuitry is configured to operate at least one counter for the content transfer requests of the malfunctioning storage device, and find the given data capacity of the cache currently assigned to the malfunctioning storage device for reallocation to the at least other storage devices responsively to a value of the at least one counter operated for the malfunctioning storage device.

There is provided in accordance with another embodiment of the present disclosure, data communication apparatus, including a storage sub-system to be connected to storage devices, and processing circuitry to assign respective weights to the storage devices, and manage transfer of content with the storage devices over the storage sub-system responsively to the content transfer requests, while pacing commencement of serving of respective ones of the content transfer requests responsively to the respective weights of the storage devices so that while ones of the content transfer requests are being served, other ones of the content transfer requests pending serving are queued in at least one pending queue.

Additionally in accordance with an embodiment of the present disclosure the processing circuitry is configured to manage transfer of the content with the storage devices over the storage sub-system responsively to the content transfer requests, while pacing commencement of serving of the respective content transfer requests responsively to availability of spare data capacity of the storage sub-system.

Moreover, in accordance with an embodiment of the present disclosure the storage sub-system includes a cache, and the spare data capacity is spare cache capacity.

Further in accordance with an embodiment of the present disclosure the processing circuitry is configured to select the respective content transfer requests for serving by the storage sub-system using a weighted round-robin selection from the at least one pending queue, the weighted round-robin being weighted responsively to the weights of the storage devices to which the content transfer requests are targeted.

Still further in accordance with an embodiment of the present disclosure the at least one pending queue includes different storage device specific queues, and the processing circuitry is configured to assign the respective content transfer requests to the different storage device specific queues responsively to the respective storage devices to which the respective content transfer requests are targeted, and select the respective content transfer requests for serving using a weighted round-robin selection from the storage device specific queues, the weighted round-robin being weighted responsively to the weights of the storage devices.

Additionally in accordance with an embodiment of the present disclosure the processing circuitry is configured to assign the respective weights to the storage devices responsively to respective performance of the storage devices.

Moreover, in accordance with an embodiment of the present disclosure the processing circuitry is configured to monitor the respective performance of the storage devices, and dynamically update the respective weights assigned to the storage devices responsively to the monitoring.

There is provided in accordance with an additional embodiment of the present disclosure, data communication method, including managing transfer of content with storage devices over a storage sub-system responsively to content transfer requests, while pacing commencement of serving of respective ones of the content transfer requests responsively to availability of spare data capacity of the storage sub-system so that while ones of the content transfer requests are being served, other ones of the content transfer requests pending serving are queued in at least one pending queue, finding a malfunctioning storage device of the storage devices currently assigned a given data capacity of the storage sub-system and currently assigned to serve at least one of the content transfer requests, and reallocating the given data capacity of the storage sub-system currently assigned to the malfunctioning storage device for use by at least another one of the storage devices while the at least one content transfer request assigned to be served by the malfunctioning storage device is still awaiting completion by the malfunctioning storage device.

There is also provided in accordance with still another embodiment of the present disclosure, data communication method, including assigning respective weights to storage devices, and managing transfer of content with the storage devices over a storage sub-system responsively to the content transfer requests, while pacing commencement of serving of respective ones of the content transfer requests responsively to the respective weights of the storage devices so that while ones of the content transfer requests are being served, other ones of the content transfer requests pending serving are queued in at least one pending queue.

BRIEF DESCRIPTION OF THE DRAWINGS

The present invention will be understood from the following detailed description, taken in conjunction with the drawings in which:

FIG. 21 is a flowchart including steps in a sub-method of the method of FIG. 13 to find a malfunctioning storage device and reallocate the data capacity of the found malfunctioning storage device including using counters.

DESCRIPTION OF EXAMPLE EMBODIMENTS

Overview

Figure 1:
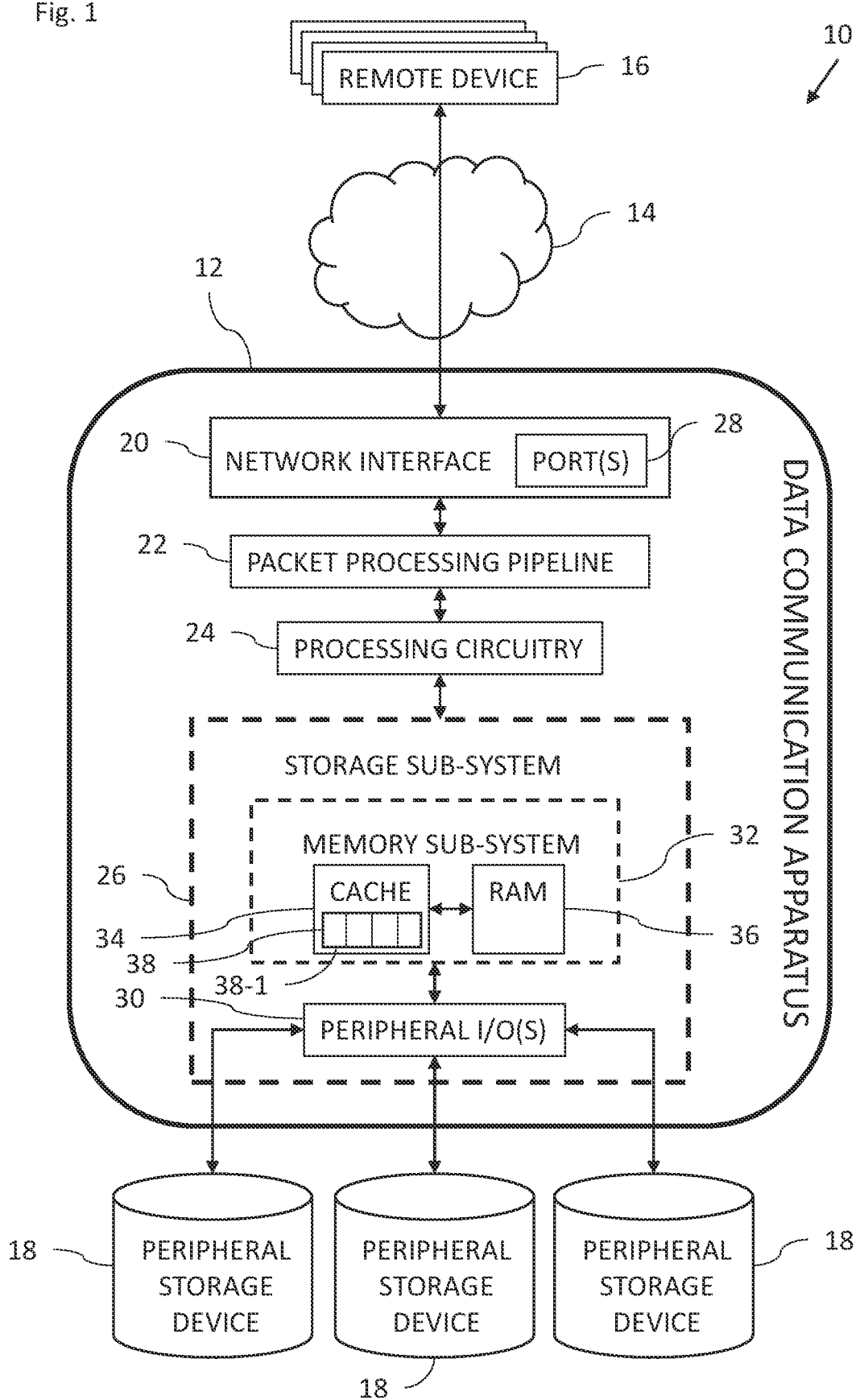
FIG. 1 is a block diagram view of a data communication system constructed and operative in accordance with an embodiment of the present invention.

As previously mentioned, some data communication devices such as smart NICs (e.g., Mellanox® BlueField®-2 data processing unit) support directly reading or writing to attached local peripheral storage devices (e.g., NVM express (NVMe) drives) via a storage sub-system in response to remote initiator requests (e.g., content transfer requests received from devices over a network to which the data communication device is connected).

Depending on the level of content transfer requests and the speed and bandwidth of the network, storage sub-system interfaces and the local peripheral storage devices, the storage sub-system may suffer from congestion leading to a deterioration in system response to serving the incoming content transfer requests.

For example, the storage sub-system may include a random-access memory (RAM) (e.g., Double Data Rate (DDR) memory) which is used to transfer content between the data communication device and the local peripheral storage devices, and vice-versa. In some cases, the RAM is not the bottleneck as the local peripheral storage devices are slow. In other cases, where the peripheral storage devices are fast enough (e.g., NVMe drives), the RAM may become the bottleneck as it is slower than the local peripheral storage devices and the network ports serving the initiators of the content transfer requests.

One method to solve this problem is to use a cache (e.g., last level cache (LLC)) in which to copy data between the data communication device and the local peripheral storage devices, and vice-versa. However, if the cache becomes full, cache entries (which still need to be used) may be evicted to the RAM (for example, on a least recently used (LRU) basis). The evicted entries then need to be read from RAM to the cache, when necessary, leading to a bottleneck. In general, the cache may be selected to service the network bandwidth and if the data communication device is successful in keeping all entries (that need to be used) in the cache then the cache can service the content transfer requests at full wire speed. However, once entries are evicted from the cache to the RAM, a vicious cycle may be formed in which it can take a long time to return to optimal performance where no entries (that need to be used) are evicted from the cache.

Therefore, in some cases, if all received content transfer requests are served, the cache becomes a bottleneck and cache entries (which still need to be used) are evicted to RAM. One solution is to request initiators to refrain from sending content transfer requests. However, this solution is generally not practical as initiators may be from different entities or otherwise non-compliant.

In some scenarios, other interfaces in the storage sub-system, such as PCIe interfaces may become the transfer bottleneck. For example, each NVMe drive has a given input/output (I/O) rate and given bandwidth limitations. If too many requests are sent to an NVMe drive, the requests may become out-of-order on the NVMe drive resulting in high latency and degradation in performance. In such a situation, although the PCIe interface may handle the level of requests, the relevant buffers are filled with data which could be better used by another I/O device.

One solution to the above problems is to provide a data communication apparatus (e.g., NIC or smart NIC) which manages transfer of content between remote device(s) and local peripheral storage devices (e.g., NVMe drives) over a storage sub-system, responsively to content transfer requests received from the remote device(s), while pacing commencement of serving the content transfer requests responsively to at least one metric of the storage sub-system so that while some content transfer requests are being served, other content transfer requests pending serving are queued in one or more pending queues. The metric(s) may include a data capacity of a cache and/or data-throughput rates of the storage sub-system (e.g., of the peripheral interfaces).

One possible pacing solution includes pacing according to the I/O rates of respective I/O devices (e.g., I/O interfaces). For example, data-throughput rate credits are assigned to the respective peripheral interfaces so that use of the respective peripheral interfaces is limited to availability of respective data-throughput rate credits. For example, if there are three peripheral interfaces with data-throughput rates (e.g., I/O rates) of X GB per second, Y GB per second and Z GB per second, and the wire speed is greater than X plus Y plus Z, then content transfer requests may be queued in three respective pending queues for the three peripheral interfaces according to which peripheral interface the content transfer requests should be directed, and the three respective pending queues may be allocated A, B and C credits in proportion to X, Y and Z, respectively. The requests in the pending queues are then served according to the available data-throughput rate credits of the respective pending queues. However, this type of pacing is a reactive method, reacting to changes in the I/O rates leading to storage sub-system resources being wasted in some cases.

Another possible pacing solution, which addresses the above problem, is pacing responsively to spare data capacity of the cache. For example, if there is spare storage capacity in the cache (e.g., a part of the cache is currently not being used to serve content transfer requests), the spare capacity may be used to serve one or more new content transfer requests (depending on the size of the spare capacity). If there is no spare capacity, incoming content transfer requests are queued until space capacity is available. Pacing may be performed based on data-capacity credits. The credits may be provided according to the size of the cache. For example, if the cache has a size of X which can serve Y simultaneous transfer requests, Y credits are provided. When a credit is available, serving a content transfer request from the queue is commenced. The credit is then removed from availability, and returned to availability when the content transfer request has completed to be served.

The above pacing solution may be sub-optimal if storage devices start experiencing errors. For example, if a storage device is assigned credits and then becomes stuck, the credits assigned to that storage device remain assigned to that storage device even though that storage device is inactive. Therefore, data capacity of the cache is in effect being wasted while the storage device in inactive.

Therefore, embodiments of the present invention solve the above problems by finding a malfunctioning storage device, and reallocating the data capacity currently assigned to the malfunctioning storage device for use by one or more other storage devices while the content transfer request(s) assigned to be served by the malfunctioning storage device is still awaiting completion by the malfunctioning storage device. In disclosed embodiments, counters may be used to track cache data capacity currently assigned to the storage devices and to find storage devices which are stuck or otherwise malfunctioning.

Some pacing solutions may be sub-optimal when some storage devices perform better than others. In some cases, the lower performance storage devices take away too many resources of the storage sub-system which could be more efficiently used by the higher performance storage devices.

In some embodiments, the above problems may be solved by assigning respective weights to the storage devices, and managing transfer of content with the storage devices over the storage sub-system responsively to the content transfer requests, while pacing commencement of serving of respective ones of the content transfer requests responsively to the respective weights of the storage devices.

In some embodiments, the respective content transfer requests are selected for serving using a weighted round-robin selection. The weighted round-robin is weighted responsively to the weights of the storage devices to which the content transfer requests are targeted. For example, the respective content transfer requests may be assigned to different storage device specific queues responsively to the respective storage devices to which the respective content transfer requests are targeted. The respective content transfer requests may then be selected for serving using a weighted round-robin selection from the storage device specific queues. For example, if storage device A has a weight of 1, storage device B has a weight of 2, and storage device C has a weight of 2, then 1 content transfer request is selected from the queue of storage device A, then 2 content transfer requests are selected from the queue of storage device B, and then 2 content transfer requests are selected from the queue of storage device C, according to spare data capacity of the storage sub-system.

System Description

Reference is now made to FIG. 1, which is a block diagram view of data communication system 10 constructed and operative in accordance with an embodiment of the present invention. The data communication system 10 includes data communication apparatus 12, which receives content transfer requests over a packet data network 14 from one or more remote devices 16. The content transfer requests may be RDMA requests by way of example only. In response to the content transfer requests, the data communication apparatus 12 reads data from, and/or writes data to, (local peripheral) storage devices 18 (e.g., NVMe drives) connected to the data communication apparatus 12. For example, the data communication apparatus 12 is configured to receive data from the remote device(s) 16 to be written to the local peripheral storage device(s) 18 and/or send data read from the local peripheral storage device(s) 18 to the remote device(s) 16.

The data communication apparatus 12 includes a network interface 20, a packet processing pipeline 22, processing circuitry 24, and a storage sub-system 26. The network interface 20 includes one or more ports 28 for connection to the packet data network 14. The packet processing pipeline 22 is configured to process received network packets and to process data for sending in packets over the network 14. The packet processing pipeline 22 may include a PHY chip and a MAC chip, among other components.

The processing circuitry 24 may further process received packet data for example, received content transfer requests. The processing circuitry 24 may comprise one or more processors, for example, tile processors, or an array of ARM processors. The functionality of the processing circuitry 24 is described in more detail with reference to FIGS. 2-9 below.

In practice, some or all of the functions of the processing circuitry 24 may be combined in a single physical component or, alternatively, implemented using multiple physical components. These physical components may comprise hard-wired or programmable devices, or a combination of the two. In some embodiments, at least some of the functions of the processing circuitry 24 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The storage sub-system 26 includes a memory sub-system 32 and one or more peripheral interfaces 30. The storage sub-system 26 is configured to be connected to the local peripheral storage devices 18 via the peripheral interface(s) 30, for example, PCIe interfaces. The memory sub-system 32 includes a cache 34 and a random-access memory (RAM) 36. The memory sub-system 32 is configured to evict overflow from the cache 34 to the RAM 36. Data is read by the local peripheral storage devices 18 and written by from the local peripheral storage devices 18 via the cache 34 and the peripheral interfaces 30. For example, while serving a particular content transfer request, the data written to, or read from, one of the local peripheral storage devices 18 is transferred via a section 38 of the cache 34. The same section 38 (e.g., the same cache line or same cache lines) of cache 34 may be used to transfer several data chunks associated with the same content transfer request one after the other. For example, a first data chunk of a content transfer request is read from one of the local peripheral storage devices 18 to the section 38-1 of the cache 34, and then copied from the section 38-1 of the cache 34 to the packet processing pipeline 22 for sending over the network 14 to the initiator of the content transfer request, then a second data chunk of that content transfer request is read from the same local peripheral storage devices 18 to the same section 38-1 of the cache 34, and then copied from that section 38-1 of the cache 34 to the packet processing pipeline 22 for sending over the network 14 to the initiator of the content transfer request, and so on. In other embodiments, different sections 38 of the cache 34 may be used to transfer different chunks associated with the same content transfer request.

Figure 2:
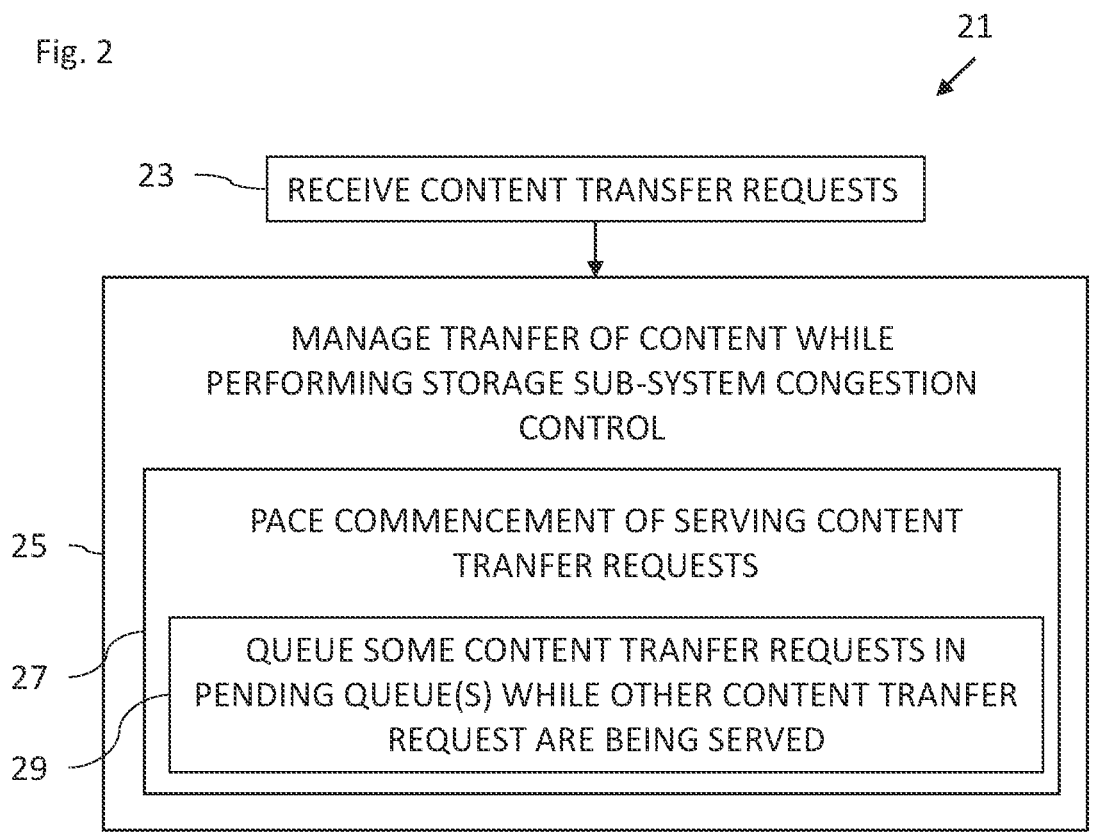
FIG. 2 is a flowchart including steps in a method to provide storage sub-system congestion control in the system of FIG. 1.

Reference is now made to FIG. 2, which is a flowchart 21 including steps in a method to provide storage sub-system congestion control in the system 10 of FIG. 1. Reference is also made to FIG. 1. The network interface 20 is configured to receive (block 23) content transfer requests from the remote device(s) 16 over the packet data network 14 via the one or more ports 28. The content transfer requests are processed by the packet processing pipeline 22 and received by the processing circuitry 24.

The processing circuitry 24 is configured to manage transfer (block 25) of content between the remote device(s) 16 and the local peripheral storage devices 18, responsively to the content transfer requests, while performing storage sub-system congestion control of the storage sub-system 26 transparently to the storage sub-system 26.

In some embodiments, the processing circuitry 24 is configured to manage transfer of content between the remote device(s) 16 and the local peripheral storage devices 18 via the peripheral interface(s) 30 and the cache 34, responsively to the content transfer requests. The step of block 25 is performed while pacing (block 27) commencement of serving the content transfer requests responsively to one or more metrics of the storage sub-system 26 so that while some content transfer requests are being served, other content transfer requests pending serving are queued in at least one pending queue (block 29). The term "commencement of serving", as used in the specification and claims, is defined as the processing circuitry 24 initiating transferring requested data by the storage sub-system 26 in response to one of the content transfer requests so that none of the data requested in that content transfer request in transferred until the commencement of serving of that content transfer request. In other words, initiation of transferring data requested in a content transfer request is performed responsively to the metric(s) of the storage sub-system 26 (e.g., the cache 34 and/or the peripheral interfaces 30). The metric(s) may include a data capacity of the cache 34 and/or data-throughput rates of the storage sub-system 26 (e.g., of the peripheral interfaces 30).

Figure 3:
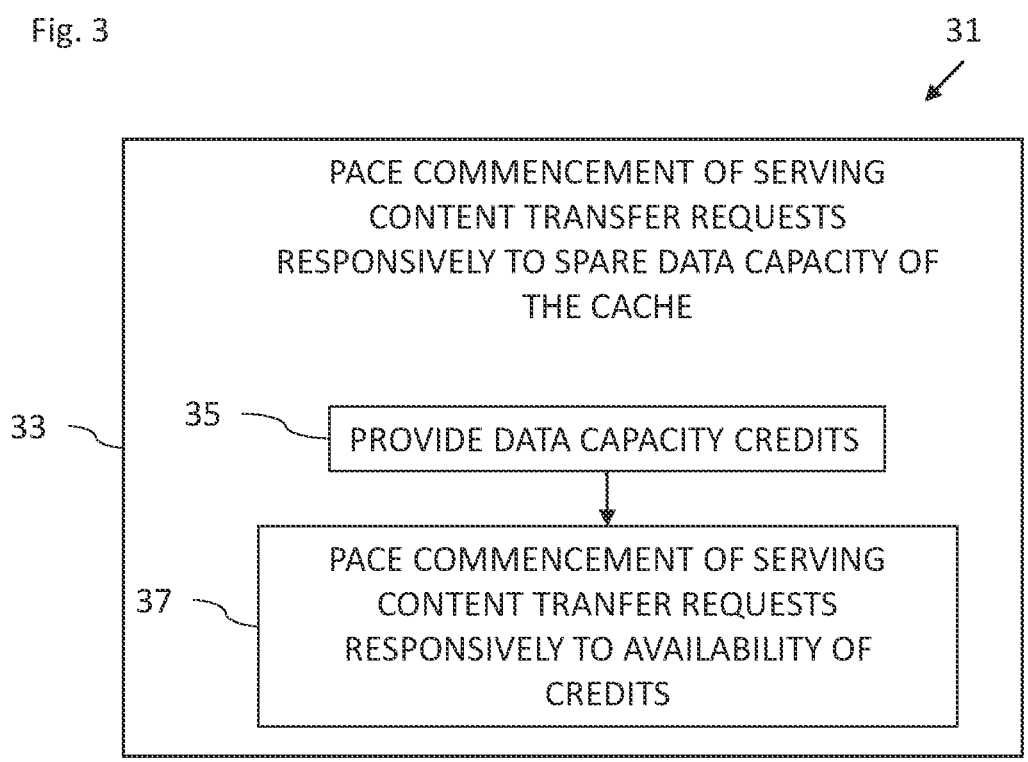
FIG. 3 is a flowchart including steps in a method to perform pacing in the system of FIG. 1.

Reference is now made to FIG. 3, which is a flowchart 31 including steps in a method to perform pacing in the system 10 of FIG. 1. Reference is also made to FIG. 1. The processing circuitry 24 is configured to pace (block 33) the commencement of the serving of respective ones of the content transfer requests responsively to spare data capacity of the cache 34.

The processing circuitry 24 is configured to provide (block 35) data-capacity credits responsively to the size of the cache. For example, if the cache has X sections 38 which may be used for simultaneously serving X respective content transfer requests, then the processing circuitry 24 is configured to provide X data-capacity credits. The step of block 35 is described in more detail with reference to FIG. 5. The processing circuitry 24 is configured to pace (block 37) the commencement of the serving of the respective content transfer requests responsively to availability of the data-capacity credits. The step of block 37 is described in more detail with reference to FIG. 6.

Figure 4:
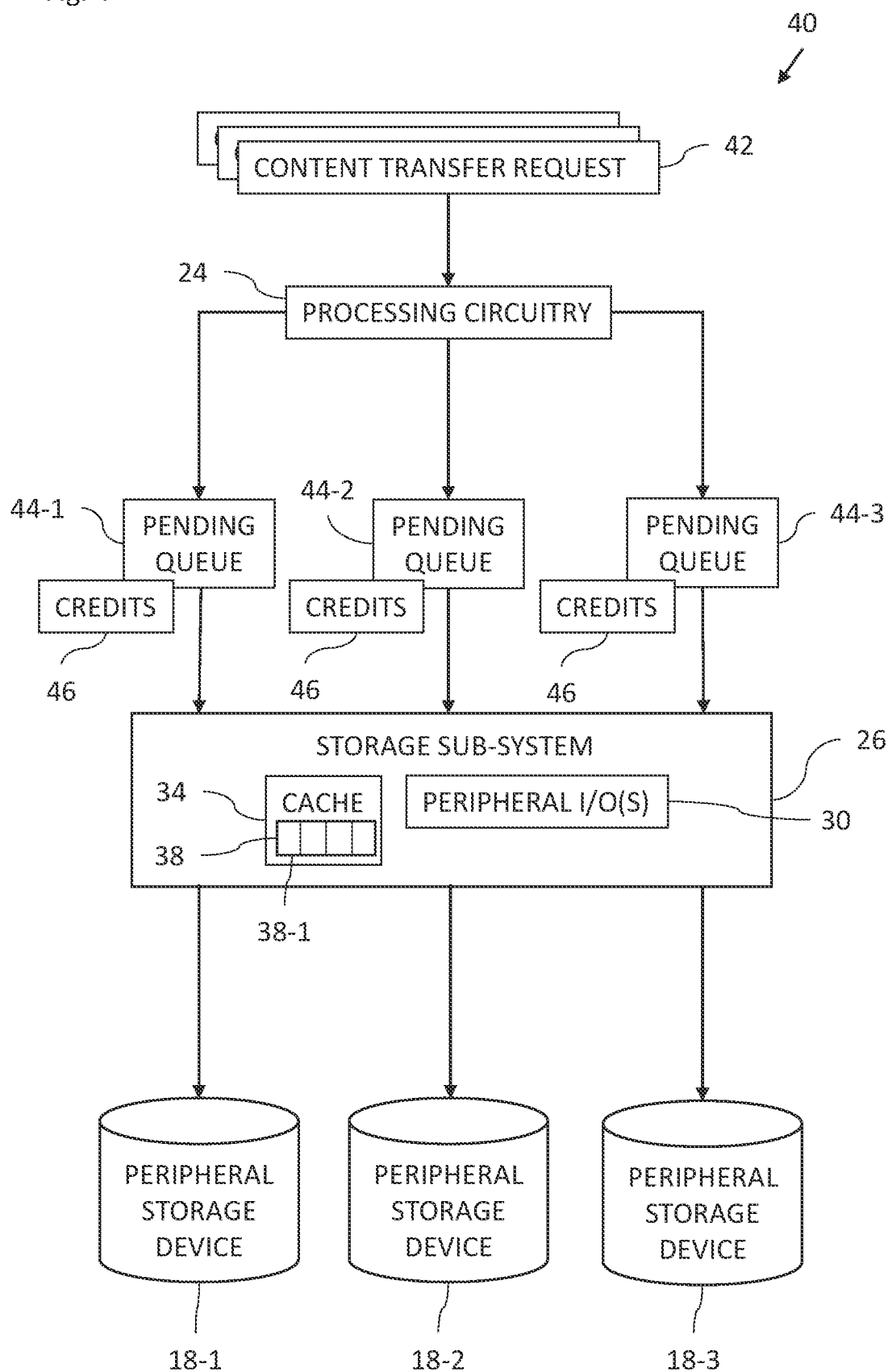
FIG. 4 is a block diagram to illustrate pacing of content transfer requests in the system of FIG. 1.
Figure 5:
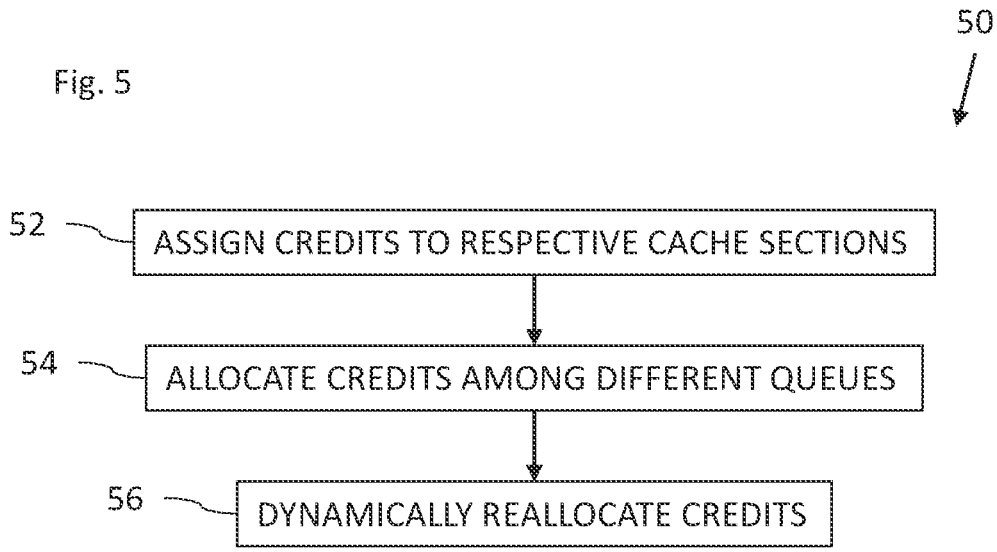
FIG. 5 is a flowchart including steps in a method to provide data-capacity credits in the system of FIG. 1.

Reference is now made to FIGS. 4 and 5. FIG. 4 is a block diagram 40 to illustrate pacing of serving content transfer requests 42 in the system 10 of FIG. 1. FIG. 5 is a flowchart 50 including steps in a method to provide data-capacity credits 46 in the system 10 of FIG. 1.

As previously mentioned, the cache 34 includes respective cache sections 38. The processing circuitry 24 may be configured to assign (block 52) respective data-capacity credits 46 to the respective cache sections 38 so that use of the respective cache sections 38 is limited to availability of the respective data-capacity credits 46. For example, if the cache 34 has n cache sections, e.g., S1 to Sn, the processing circuitry 24 assigns n data-capacity credits 46, C1 to Cn corresponding to the n cache sections 38. If the data-capacity credit C2 is available for serving one of the content transfer requests 42, the cache section S2 is then used to serve that request.

In some embodiments, all the content transfer requests are queued in a single pending queue 44 and that queue is assigned all of the available data-capacity credits 46. In some embodiments, there are different pending queues 44 and the processing circuitry 24 is configured to allocate (block 54) the provided data-capacity credits 46 among the different pending queues 44. For example, credits C1 to C5 are allocated to pending queue 44-1, credits C6 to C10 are allocated to pending queue 44-2, and credits C11 to C15 are allocated to pending queue 44-3. The credits may be allocated to the different queues equally or unequally, for example, according to known or expected demand on those queues. FIG. 4 shows three pending queues 44 corresponding to three local peripheral storage devices 18 so that each pending queue 44 services the corresponding local peripheral storage device 18. For example, content service requests 42 for local peripheral storage device 18-1 are queued in pending queue 44-1, content service requests 42 for local peripheral storage device 18-2 are queued in pending queue 44-2, and so on. The credits 46 assigned to pending queue 44-1 are used, when available, by the content transfer requests 42 being queued in the pending queue 44-1, and so on. For example, when one of the content transfer requests 42 which was being queued in pending queue 44-1 is being served, one of the available data-capacity credits 46 allocated to pending queue 44-1 is removed from availability, and is returned to availability for use by the content transfer requests 42 of pending queue 44-1 when the content transfer request 42 has completed to be served, as described in more detail with reference to FIG. 6.

The example, of FIG. 4 shows one pending queue 44 associated with each local peripheral storage device 18. In some embodiments, each of the local peripheral storage devices 18 may be associated with a read and write queue.

The different pending queues 44 may comprises any one or more of the following: a read pending queue and a write pending queue; pending queues for different ones of the local peripheral storage devices 18; pending queues for different groups of the local peripheral storage devices 18; pending queues for different peripheral interfaces 30; pending queues for different content request attributes; or pending queues for different content request initiators.

The initial allocation of the credits 46 among the different queues 44 may be non-optimal. For example, if there are different queues 44 for different local peripheral storage devices 18, and one or more of the local peripheral storage devices 18 are slower than the other devices 18, then it may be more efficient to provide less credits 46 to the slower device(s) 18. Another example may be drives experiencing errors. Therefore, in some embodiments, the processing circuitry 24 is configured to analyze credit usage by the different pending queues 44 (for example on a round-robin basis) and dynamically reallocate (block 56) the data-capacity credits 46 among the different pending queues 44 responsively to usage of the credits 46 by the different pending queues 44. If credits 46 are being used quickly, it is an indication the associated local peripheral storage device(s) 18 are working efficiently and should be assigned more credits 46 than slower local peripheral storage device(s) 18 that are using the credits more slowly.

Figure 6:
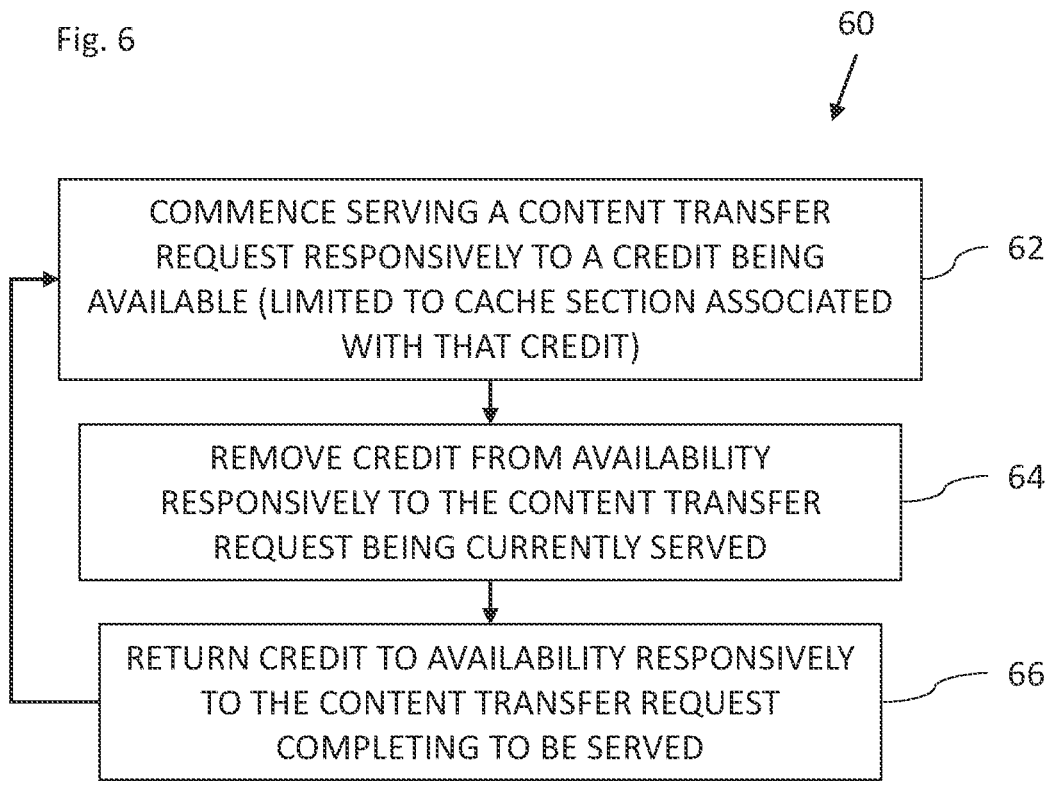
FIG. 6 is a flowchart including steps in a method to perform pacing using data-capacity credits in the system of FIG. 1.

Reference is now made to FIG. 6, which is a flowchart 60 including steps in a method to perform pacing using the data-capacity credits 46 in the system 10 of FIG. 1. Reference is also made to FIG. 4.

The processing circuitry 24 is configured to receive the content transfer requests 42 from the packet processing pipeline 22 (FIG. 1) and assign the content transfer requests 42 to respective pending queues 44 responsively to the content transfer requests 42. For example, a request to read content from, or write content to, the local peripheral storage device 18-1 will be queued in pending queue 44-1, and so on.

The processing circuitry 24 is configured to commence serving (block 62) one of the content transfer requests 42 responsively to one of the data-capacity credits 46 being available (for the pending queue 44 in which that content transfer request 42 is queued). The processing circuitry 24 is configured to remove (block 64) the available data-capacity credit 46 from availability responsively to that content transfer request 42 being currently served. The processing circuitry 24 is configured to return (block 66) the removed data-capacity credit 46 to availability responsively to that content transfer request 42 completing to be served.

Figure 7:
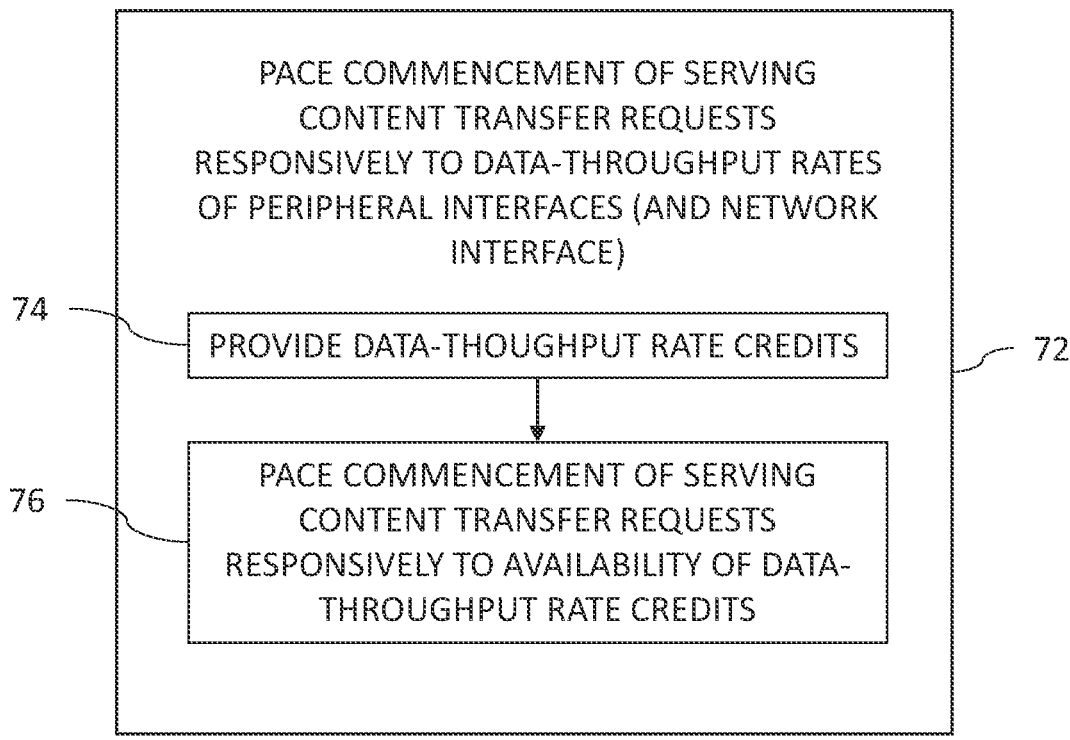
FIG. 7 is a flowchart including steps in a method to perform pacing based on data-throughput rates in the system of FIG. 1.

Reference is now made to FIG. 7, which is a flowchart 70 including steps in a method to perform pacing based on data-throughput rates in the system 10 of FIG. 1. Reference is also made to FIG. 1. The processing circuitry 24 is configured to pace (block 72) the commencement of the serving of respective content transfer requests responsively to the data-throughput rates (e.g., I/O rates) of the respective peripheral interfaces 30 and the network interface 20.

The processing circuitry 24 is configured to provide (block 74) data-throughput rate credits responsively to the data throughput rates of the peripheral interfaces 30 and the wire speed. If the cumulative data throughput rates of the peripheral interfaces 30 are greater than the wire speed, the overall data throughput rate is limited by the wire speed, otherwise the overall data throughput rate is limited by the data throughput rates of the peripheral interfaces 30. The processing circuitry 24 is configured to pace (block 76) the commencement of the serving of the respective content transfer requests responsively to availability of the data-throughput rate credits (per pending queue). For example, every fixed time period a credit (or credits) is allocated to perform an input/output operation of a specific size. In some embodiments, different pending queues may be allocated a different number of credits per fixed time period. In other embodiments, the same number of credits may be assigned to each pending queue. In some embodiments, the fixed time period or the size of the input/output operation may be the same per pending queue or different for different pending queues.

By way of example, using rounded numbers, for an available data throughput rate of 200 Gigabits per second for one or more of the peripheral interfaces 30, allow a total content transfer of 128 Kilobytes via the peripheral interface(s) 30 to be executed every 5 microseconds. Therefore, each 5 microseconds, the pending queue is analyzed and content transfer requests requesting in total up to 128 Kilobytes of data transfer are commenced to be served. Other requests are left in the pending queue for future serving when a new credit is available in 5 or 10 microseconds for example.

For example, if there are three peripheral interfaces 30 with data-throughput rates (e.g., I/O rates) of X GB per second, Y GB per second and Z GB per second, and the wire speed is greater than X plus Y plus Z, then content transfer requests may be queued in three respective pending queues for the three peripheral interfaces 30 according to which respective peripheral interface 30 the content transfer requests should be directed, and the three respective pending queues (of the three peripheral interfaces 30) may be allocated A, B and C credits in proportion to X, Y and X, respectively.

Figure 8:
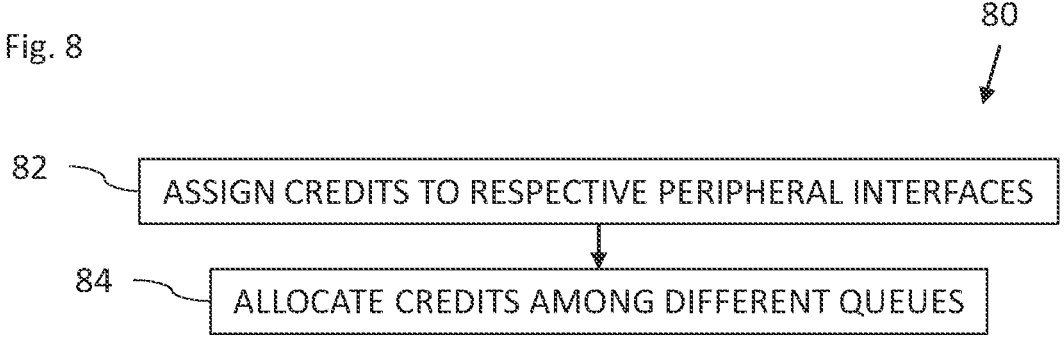
FIG. 8 is a flowchart including steps in a method to provide data-throughput rate credits in the system of FIG. 1.

Reference is now made to FIG. 8 is a flowchart 80 including steps in a method to provide data-throughput rate credits in the system 10 of FIG. 1. Reference is also made to FIG. 1. The processing circuitry 24 is configured to assign (block 82) respective ones of the data-throughput rate credits to the respective peripheral interfaces 30 (intermittently, e.g., periodically) so that use of the respective peripheral interfaces 30 is limited to availability of respective data-throughput rate credits. For example, the data-throughput credits assigned to one of the peripheral interfaces 30 are for use by content transfer requests that will use that peripheral interface to transfer data, and so on. In some embodiments, the data throughput rate credits may be assigned to different groups of peripheral interfaces 30.

In some embodiments, the processing circuitry 24 is configured to allocate (block 84) the provided data-throughput rate credits among the different pending queues (intermittently, e.g., periodically). The different pending queues may comprise any one or more of the following: a read pending queue and a write pending queue; pending queues for different ones of the local peripheral storage devices 18; pending queues for different groups of the local peripheral storage devices 18; pending queues for different ones of the peripheral interfaces 30; pending queues for different content request attributes; or pending queues for different content request initiators. For example, there may be a pending queue for each peripheral interface 30, or a pending read queue and a pending write queue for each peripheral interface 30.

The processing circuitry 24 is configured to analyze usage of the credits by the different pending queues (e.g., on a round-robin basis) and allocate the data-throughput rate credits among the different pending queues responsively to the actual rates at which the data associated with the content transfer requests in the pending queues is transferred and other metrics.

The processing circuitry 24 is configured to pace the content transfer requests in accordance with some "pacing rate". The pacing is generally not fixed, and has a feedback that may increase or decrease it. The feedback may be based on different current parameters of the data communication apparatus 12.

In some embodiments, the processing circuitry 24 may measure the actual achieved data-throughput rate of the data communication apparatus 12. If the pacing rate is higher than the measured achieved data-throughput rate, this would lead to an increase of in-flight data and eventually cache evictions and trashing of data. Therefore, the pacing rate is reduced to match the actual measured rate. Nevertheless, the pacing rate is adjusted to try to increase the pacing rate back to the maximum theoretical rate, since the transient effect that made the actual rate lower may have passed.

In other embodiments, the processing circuitry 24 may measure the known in-flight data in the data communication apparatus 12. If the total in-flight data is increasing, it implies that the actual achieved data-throughput rate is lower than the current pacing rate, and therefore the pacing rate is reduced. When total in-flight data in the data communication apparatus 12 is reduced, the pacing rate can be increased again.

Figure 9:
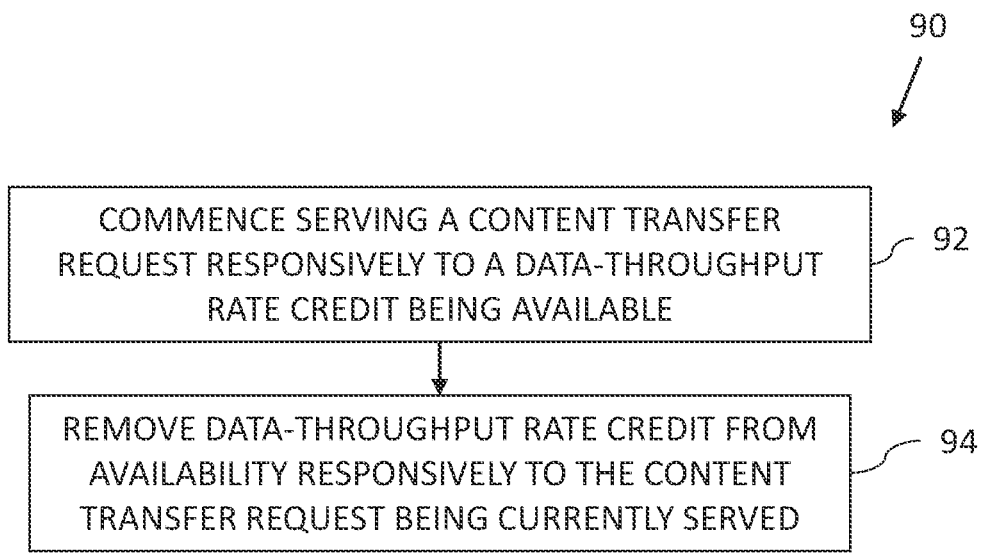
FIG. 9 is a flowchart including steps in a method to perform pacing using data-throughput rate credits in the system of FIG. 1.

Reference is now made to FIG. 9, which is a flowchart 90 including steps in a method to perform pacing using data-throughput rate credits in the system 10 of FIG. 1. The processing circuitry 24 (FIG. 1) is configured to commence serving (block 92) one or more of the content transfer requests responsively to one of the data-throughput rate credits being available (for the pending queue in which that content transfer request is queued). The processing circuitry 24 is configured to remove (block 94) the available data-throughput rate credit from availability responsively to that content transfer request being currently served.

Figure 10:
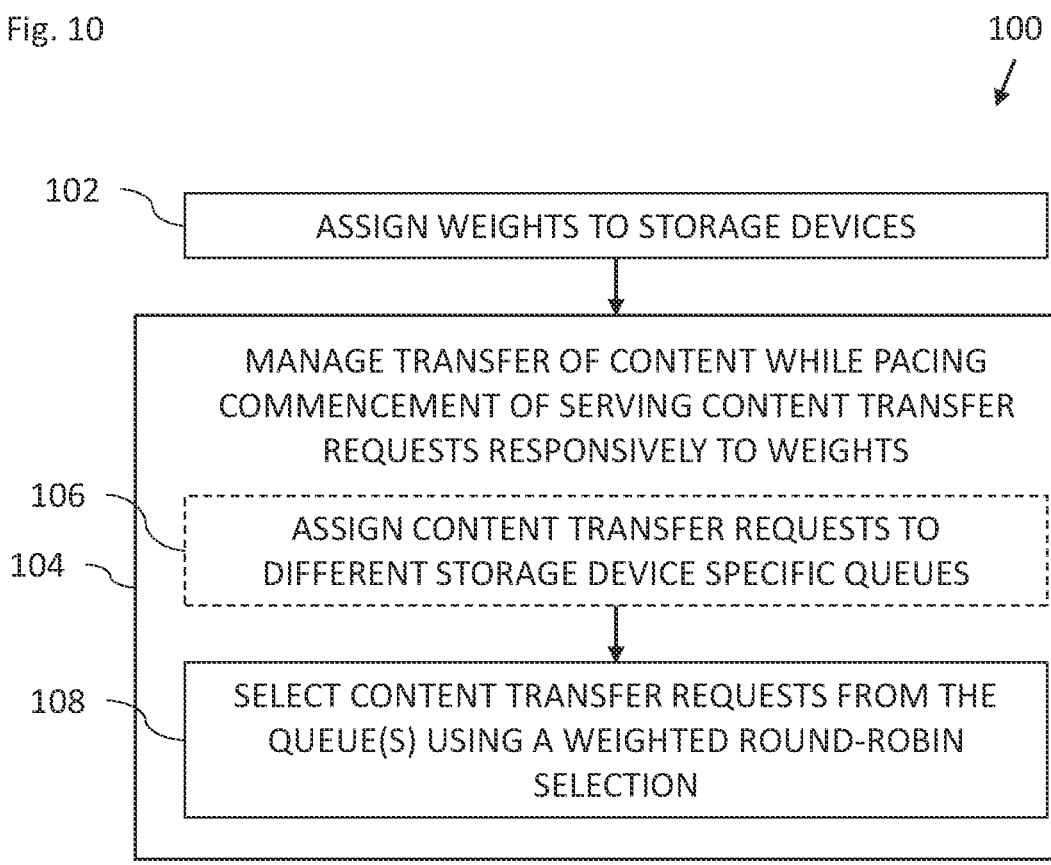
FIG. 10 is a flowchart including steps in a method to select content transfer requests using a weighted round-robin selection in the system of FIG. 1.
Figure 11:
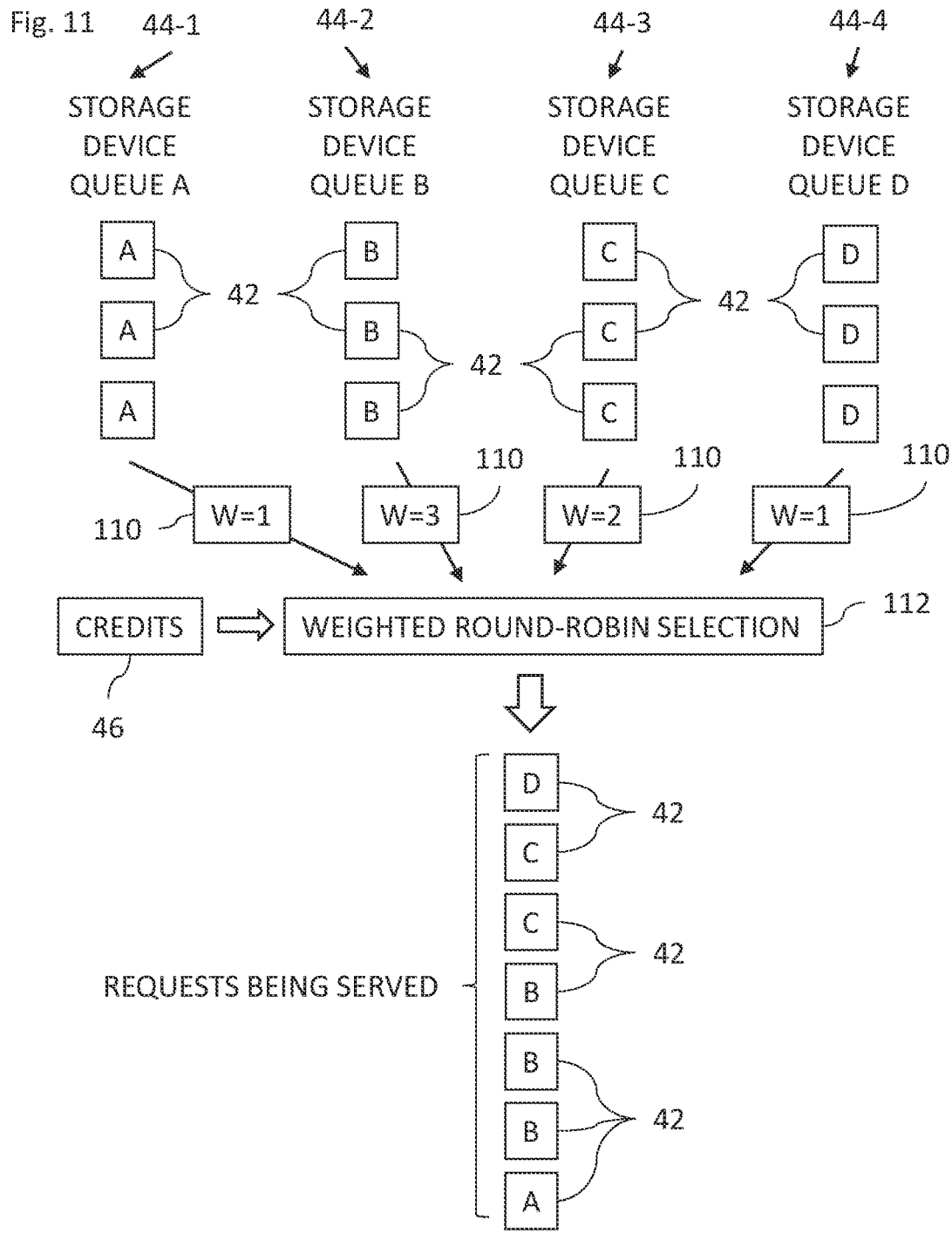
FIG. 11 is a block diagram providing an example of the method of FIG. 10.

Reference is now made to FIGS. 10 and 11. FIG. 10 is a flowchart 100 including steps in a method to select content transfer requests 42 using a weighted round-robin selection in the system 10 of FIG. 1. FIG. 11 is a block diagram providing an example of the method of FIG. 10.

The processing circuitry 24 (FIG. 1) may operate one or more pacers to pace serving content transfer requests 42. In some embodiments, the pacers may service different storage devices 18 (FIG. 1) with each pacer serving multiple storage devices 18. Some storage devices 18 may have better performance than other storage devices 18 and therefore selecting the content transfer requests 42 for serving equally across all storage devices 18 may result in sub-optimal use of the resources of the storage sub-system 26 (FIG. 1).

Therefore, the processing circuitry 24 is configured to assign (block 102) respective weights 110 to the storage devices 18. In some embodiments, the processing circuitry 24 is configured to assign the respective weights 110 to the storage devices 18 responsively to respective performance (e.g., speed, capacity, transfer rate, average access time, interface type) of the storage devices 18.

The processing circuitry 24 (FIG. 1) is configured to manage transfer (block 104) of content with the storage devices 18 (e.g., between the remote devices 16 (FIG. 1) and the storage devices 18) over the storage sub-system 26 responsively to the content transfer requests 42, while pacing commencement of serving of respective ones of the content transfer requests 42 responsively to the respective weights 110 of the storage devices 18 so that while ones of the content transfer requests 42 are being served, other ones of the content transfer requests 42 pending serving are queued in the pending queue(s) 44.

In some embodiments, the processing circuitry 24 is configured to manage transfer of the content with the storage devices 18 over the storage sub-system 26 responsively to the content transfer requests 42, while pacing commencement of serving of the respective content transfer requests 42 responsively to availability of spare data capacity (e.g., spare cache capacity of the cache 34 of FIG. 1) of the storage sub-system and the respective weights of the storage devices 18. The pacing may be implemented using data-capacity credits 46 described in more detail above with reference to FIG. 4, or using data-throughput rate credits described with reference to FIGS. 7-9.

In some embodiments, the processing circuitry 24 is configured to select (block 108) the respective content transfer requests 42 for serving by the storage sub-system 26 using a weighted round-robin selection (block 112) from the pending queue(s) 44 (FIG. 4). The weighted round-robin is weighted responsively to the weights 110 of the storage devices 18 to which the content transfer requests 42 are targeted.

In some embodiments, the pending queue 44 includes different storage-device-specific queues 44. In the example of FIG. 11, four storage-device-specific queues 44 are shown, namely, storage device queue 44-1 for storage device A, storage device queue 44-2 for storage device B, storage device queue 44-3 for storage device C, and storage device queue 44-4 for storage device D. In the example of FIG. 11, storage device A is assigned a weight of 1, storage device B is assigned a weight of 3, storage device C is assigned a weight of 2, and storage device D is assigned a weight of 1.

The processing circuitry 24 is configured to assign (block 106) the respective content transfer requests 42 to the different storage device specific queues 44 responsively to the respective storage devices 18 to which the respective content transfer requests 42 are targeted. For example, content transfer requests 42 (shown with the letter "A" in FIG. 11) for storage device A are queued in the storage device queue 44-1, and so on. The processing circuitry 24 is configured to select (block 108) the respective content transfer requests 42 for serving using a weighted round-robin selection (block 112) from the storage device specific queues 44 with the weighted round-robin being weighted responsively to the weights 110 of the storage devices. In the example of FIG. 11, as spare data-capacity credits 46 become available, for example, one content transfer request 42 is selected from pending queue 44-1 responsively to the weight of 1 of storage device A, then three content transfer requests 42 are selected from the pending queue 44-2 responsively to the weight of 3 of storage device B, then two content transfer requests 42 are selected from the pending queue 44-3 responsively to the weight of 2 of storage device C, and then one content transfer request 42 is selected from the pending queue 44-4 responsively to the weight of 1 of storage device D, and so on. The selection then continues in a round-robin fashion according to spare capacity of the storage sub-system 26 and the queued content transfer requests 42. Therefore, higher performance (e.g., faster) storage devices 18 receive more content transfer requests 42 than lower performance storage devices 18 thereby leading to significant performance improvements in transferring content over the storage sub-system 26. Malfunctioning storage devices 18 could be temporarily assigned a weight 110 of zero until the storage devices 18 are no longer malfunctioning.

Figure 12:
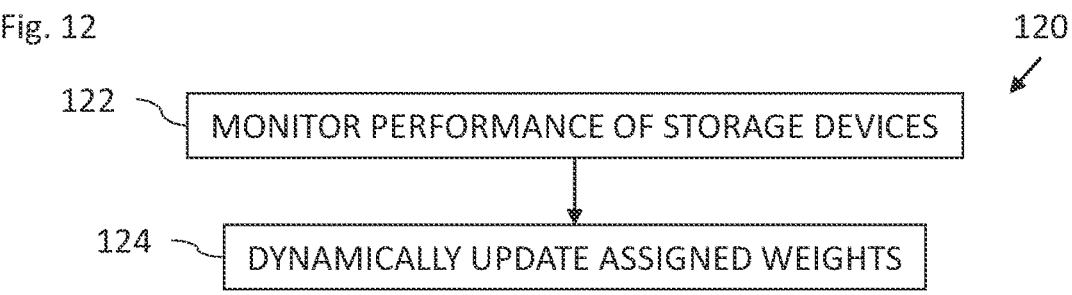
FIG. 12 is a flowchart including steps in a method to dynamically assign weights in the system of FIG. 1.

Reference is now made to FIG. 12, which is a flowchart 120 including steps in a method to dynamically assign weights 110 in the system 10 of FIG. 1. Reference is also made to FIG. 11. The processing circuitry 24 (FIG. 1) is configured to: monitor (block 122) the respective performance of the storage devices 18; and dynamically update (block 124) the respective weights 110 assigned to the storage devices 18 responsively to the monitoring.

The pacing method described above with reference to FIGS. 3-6 may be sub-optimal if one or more of the storage devices 18 start experiencing errors. For example, if one of the storage devices 18 is assigned credits 46 and then becomes stuck, the credits 46 assigned to that stuck storage device 18 remain assigned to that stuck storage device 18 even though that stuck storage device 18 is inactive. Therefore, data capacity of the cache 34 is in effect being wasted while the storage device 18 in inactive. Therefore, embodiments of the present invention, described hereinbelow with reference to FIGS. 13-21 describe a system and method to find a malfunctioning storage device 18, and reallocate the data capacity currently assigned to the malfunctioning storage device 18 for use by one or more other storage devices while the content transfer request(s) assigned to be served by the malfunctioning storage device 18 is still awaiting completion by the malfunctioning storage device. In disclosed embodiments described with reference to FIGS. 17-21, counters are used to track cache data capacity currently assigned to the storage devices 18 and to find storage devices 18 which are stuck or otherwise malfunctioning.

Figure 13:
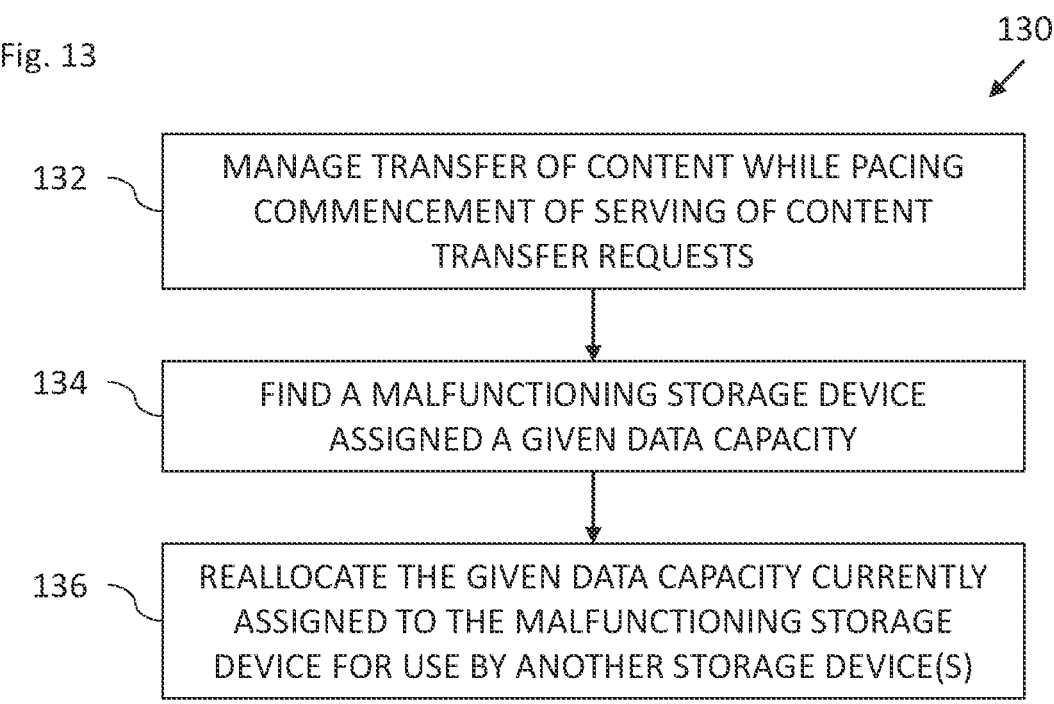
FIG. 13 is a flowchart including steps in a method to reallocate data capacity from a malfunctioning storage device in the system of FIG. 1.

Reference is now made to FIG. 13, which is a flowchart 130 including steps in a method to reallocate data capacity from a malfunctioning storage device 18 in the system 10 of FIG. 1.

The processing circuitry 24 (FIG. 1) is configured to manage transfer (block 132) of content with the storage devices 18 (e.g., between the storage devices 18 and the remote devices 16) over the storage sub-system 26 responsively to content transfer requests 42 (FIG. 4), while pacing commencement of serving of respective ones of the content transfer requests 42 responsively to availability of spare data capacity (e.g., spare cache capacity of the cache 34) of the storage sub-system 26 so that while some content transfer requests 42 are being served, other content transfer requests 42 pending serving are queued in the pending queue(s) 44.

The processing circuitry 24 is configured to find (block 134) a malfunctioning storage device (of the storage devices 18) currently assigned a given data capacity (e.g., via one or more of the data-capacity credits 46 (FIG. 4)) of the storage sub-system 26 and currently assigned to serve one or more content transfer requests 42. Finding malfunctioning storage devices 18 is described in more detail with reference to FIGS. 16 and 21.

Each storage device 18 may be associated with a status flag. The status flag may be equal to "ready" (or equivalent descriptor) for a storage device 18 which is correctly functioning, and equal to "malfunctioning" (or equivalent descriptor) for a storage device 18 which is malfunctioning.

The processing circuitry 24 is configured to reallocate (block 136) the data capacity of the storage sub-system 26 currently assigned to the found malfunctioning storage device 18 for use by one or more other storage devices 18 while the content transfer request(s) assigned to be served by the malfunctioning storage device 18 is/(are) still awaiting completion by the malfunctioning storage device 18. Reallocating the given data capacity is described in more detail with reference to FIGS. 16, 18, and 21.

Figure 14:
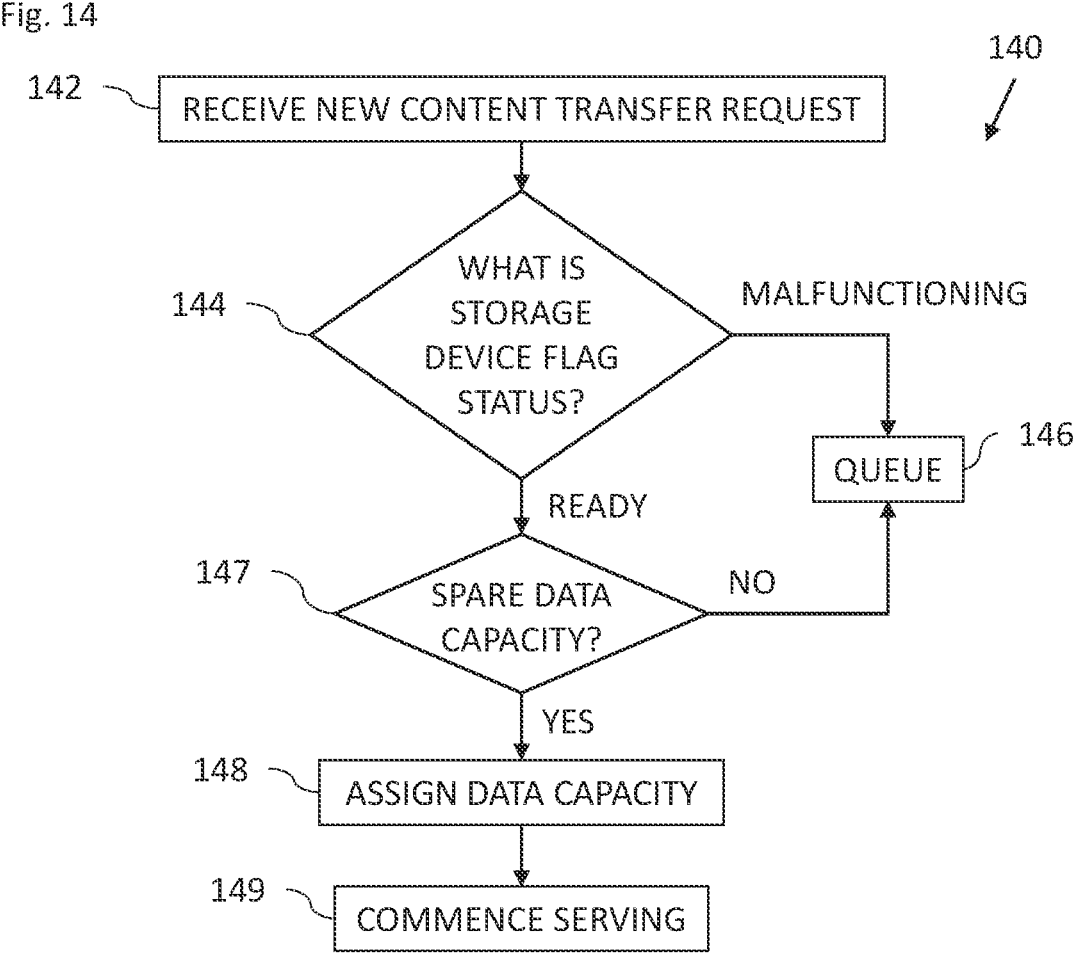
FIG. 14 is a flowchart including steps in a sub-method of the method of FIG. 13 to process a new content transfer request.

Reference is now made to FIG. 14, which is a flowchart 140 including steps in a sub-method of the method of FIG. 13 to process a new content transfer request 42. The sub-method described below may be performed while one or more of the storage devices 18 are malfunctioning (and the associated status flag(s) are equal to "malfunctioning") or if all of the storage devices 18 are functioning correctly (and have status flags equal to "ready").

The processing circuitry 24 is configured to receive (block 142) a new content transfer request 42. At a decision block 144, the processing circuitry 24 is configured to check the status of the storage device 18 to which the new content transfer request 42 is targeted. If that storage device 18 has a flag status of "malfunctioning", the processing circuitry 24 is configured to add (block 146) the new content transfer request 42 to the pending queue 44 or one of the pending queues 44 (e.g., the pending queue 44 for that storage device 18 or one of the pending queues 44 for that storage device).

If that storage device 18 has a flag status of "ready", the processing circuitry 24 is configured to check (at a decision block 147) if there is enough available spare data capacity (e.g., spare data-capacity credits 46) of the storage sub-system 26 to serve the new content transfer request 42. If there is not enough available spare data capacity to serve the new content transfer request 42, the processing circuitry 24 is configured to add (block 146) the new content transfer request 42 to the pending queue 44 or one of the pending queues 44 (e.g., the pending queue 44 for that storage device 18 or one of the pending queues 44 for that storage device).

If there is enough available spare data capacity of the storage sub-system 26 to serve the new content transfer request 42, the processing circuitry 24 is configured to: assign (block 148) data capacity (e.g., data-capacity credits 46) (from a pool of spare data capacity) to the new content transfer request 42; and commence (block 149) serving the new content transfer request 42, without first adding the new content transfer request 42 to the pending queue(s) 44.

Figure 15:
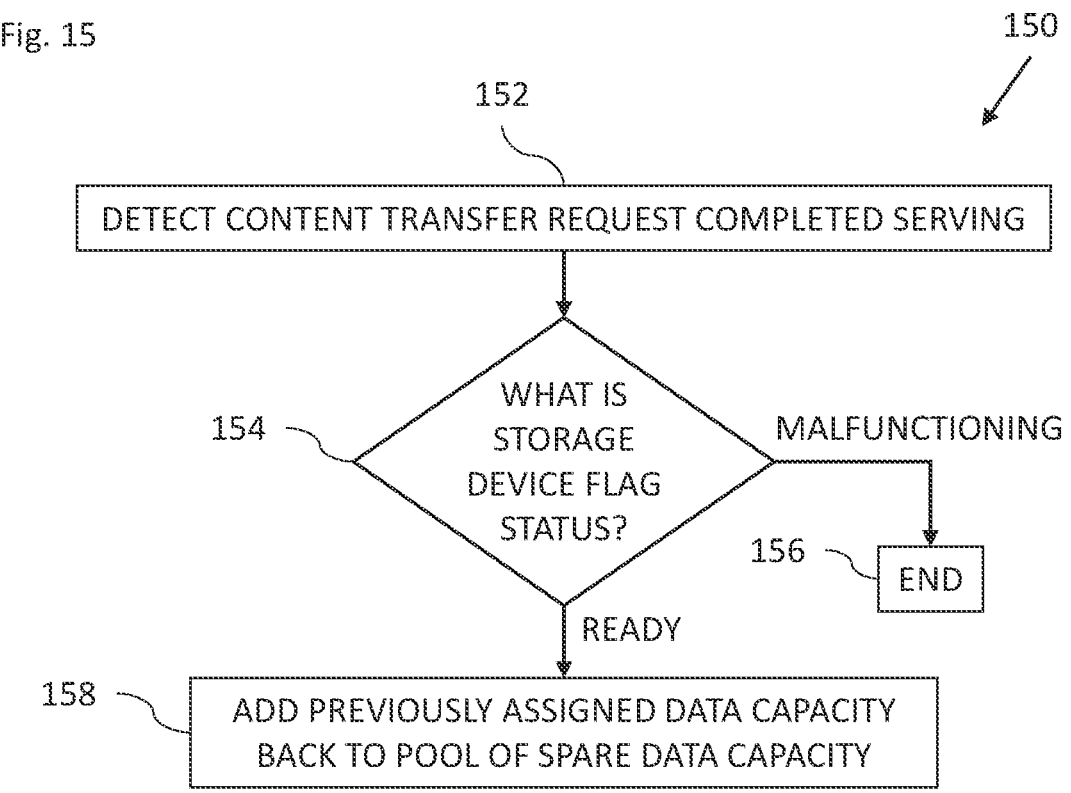
FIG. 15 is a flowchart including steps in a sub-method of the method of FIG. 13 to process completion of serving a content transfer request.

Reference is now made to FIG. 15, which is a flowchart 150 including steps in a sub-method of the method of FIG. 13 to process completion of serving one of the content transfer requests 42. The processing circuitry 24 is configured to detect (block 152) that one of the content transfer requests 42 has completed serving by the storage sub-system 26 (e.g., responsively to receiving a completion notification from the storage sub-system 26). At a decision block 154, the processing circuitry 24 is configured to check the status flag of the storage device 18 associated with the completed content transfer request 42. If the status flag is equal to "malfunctioning", the sub-method ends (block 156). If the status flag is equal to "ready", the processing circuitry 24 is configured to add (block 158) the data capacity previously assigned to serving the completed content transfer request 42, back to the pool of spare data capacity. For example, if X data-capacity credits 46 were assigned to the completed content transfer request 42, the X credits are now added back to the pool of spare data capacity for assignment to other content transfer requests 42 waiting in the pending queue(s) 44.

Figure 16:
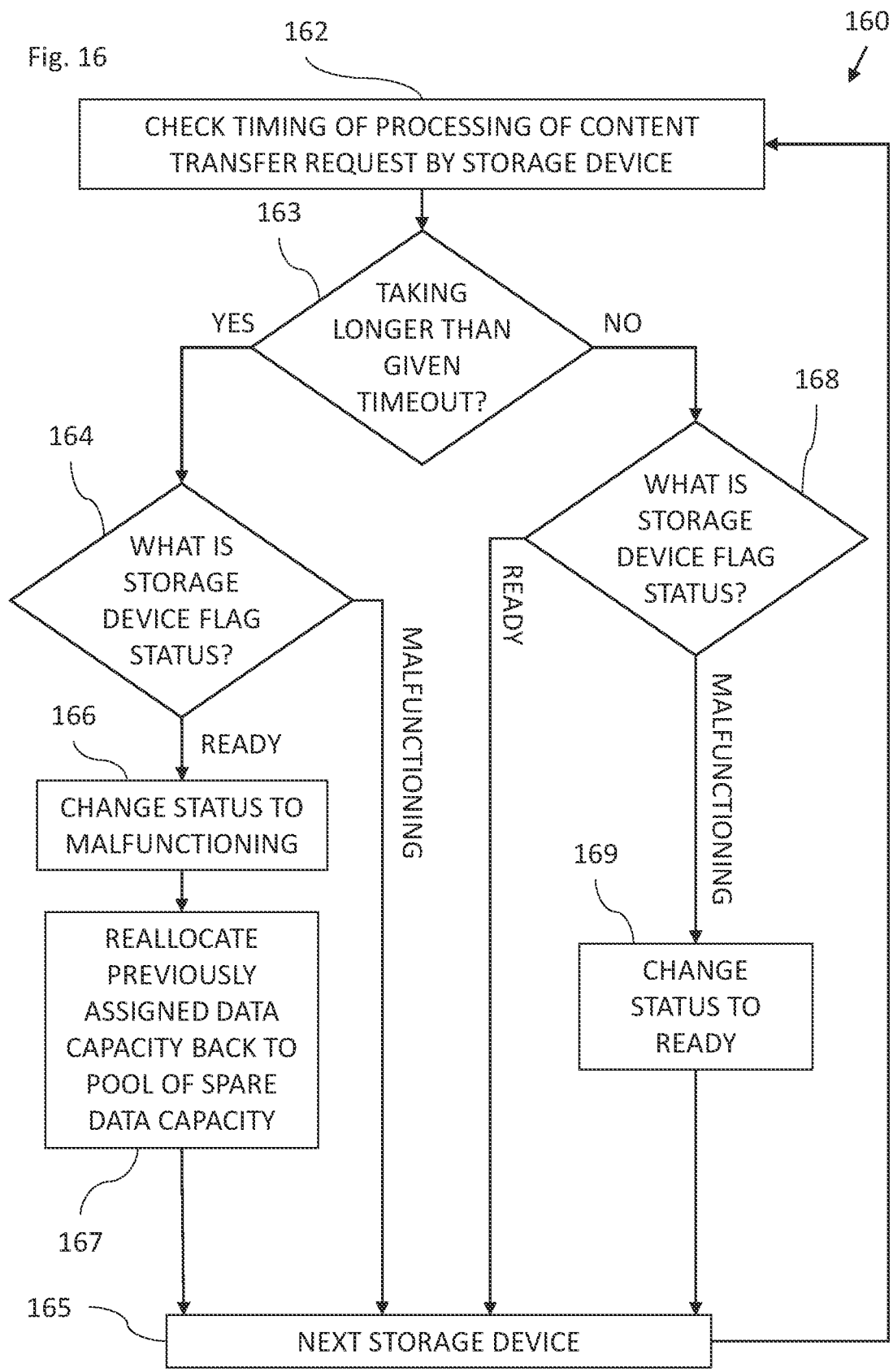
FIG. 16 is a flowchart including steps in a sub-method of the method of FIG. 13 to find a malfunctioning storage device and reallocate the data capacity of the found malfunctioning storage device.

Reference is now made to FIG. 16, which is a flowchart 160 including steps in a sub-method of the method of FIG. 13 to find a malfunctioning storage device and reallocate the data capacity of the found malfunctioning storage device. The steps of blocks 162-167, described below, describe the processing circuitry 24 being configured to find a malfunctioning storage device responsively to the malfunctioning storage device taking longer than a given timeout value to complete serving content transfer request(s) 42.

The processing circuitry 24 is configured to select one of the storage devices 18 and check (block 162) timing of processing of the content transfer request(s) 42 being processed by the selected storage device 18. At a decision block 163, the processing circuitry 24 is configured to determine if the selected storage device 18 is taking longer than a given timeout to complete serving the content transfer request(s) 42. If the selected storage device 18 is taking longer than the given timeout to complete serving the content transfer request(s) 42, the processing circuitry 24 is configured (at a decision block 164) to determine the status of the selected storage device 18. If the status flag of the selected storage device 18 is already equal to "malfunctioning", processing continues with the step of block 165, described below. If the status flag of the selected storage device 18 is equal to "ready", the processing circuitry 24 is configured to: change (block 166) the status flag of the selected storage device 18 to indicate that the selected storage device 18 is malfunctioning; and reallocate (block 167) the previously assigned data capacity of the storage sub-system 26 currently assigned to the found malfunctioning storage device 18 for use by one or more other storage devices 18 while the content transfer request(s) assigned to be served by the malfunctioning storage device 18 is/(are) still awaiting completion by the malfunctioning storage device 18.

Returning to decision block 163, if the selected storage device 18 is not taking longer than the given timeout to complete serving the content transfer request(s) 42, the processing circuitry 24 is configured (at a decision block 168) to determine the status of the selected storage device 18. If the status flag of the selected storage device 18 is equal to "ready", processing continues with the step of block 165, described below. If the status flag of the selected storage device 18 is equal to "malfunctioning", thereby indicating that the selected storage device has started to operate again and has processed any pending content transfer requests 42, the processing circuitry 24 is configured to change (block 169) the status flag of the selected storage device 18 to "ready" indicating that the selected storage device 18 is functioning correctly and processing continues with the step of block 165, described below.

At the step of block 165, the processing circuitry 24 is configured to select another storage device 18 and continue processing with the step of block 162. The step of block 165 is repeated until all the storage devices 18 have been selected. The sub-method described with reference to FIG. 16 is repeated periodically.

Figure 17:
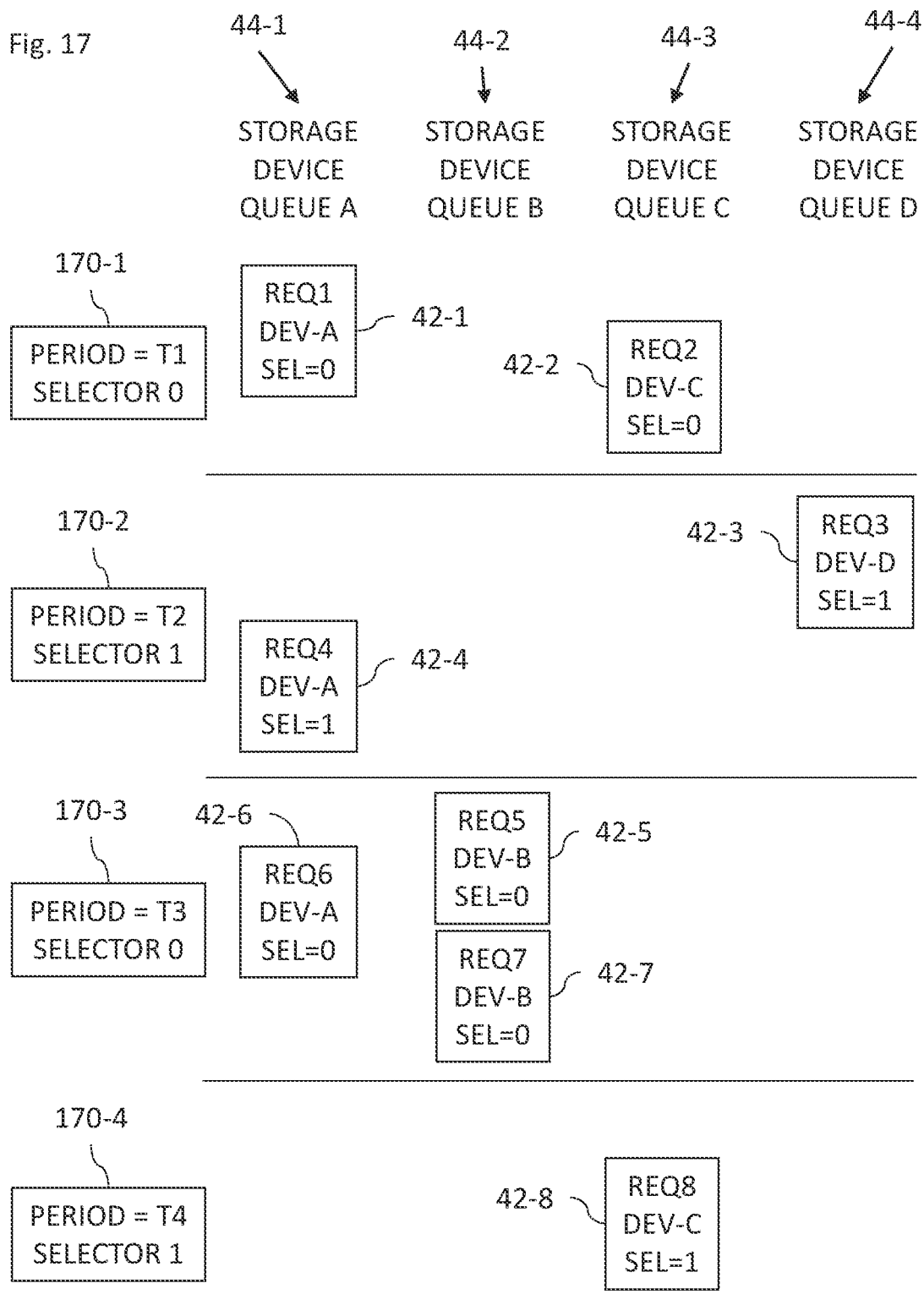
FIG. 17 is a block diagram illustrating processing of content transfer requests over different time periods and selector indices in the method of FIG. 13.

Reference is now made to FIG. 17, which is a block diagram illustrating processing of content transfer requests 42 over different time periods and selector indices 170 in the method of FIG. 13.

FIG. 17 shows time periods T1 to T4. The selector index alternates between 0 and 1 over successive time periods. For example, in time period T1, the selector index is set to 0 (block 170-1). In time period T2, the selector index is set to 1 (block 170-2). In time period T3, the selector index is set to 0 (block 170-3). In time period T4, the selector index is set to 1 (block 170-4).

The processing circuitry 24 uses counters to track malfunctioning storage devices 18 over different time periods. In some embodiments, the content transfer requests 42 being processed by each storage device 18 are tracked by the processing circuitry 24 using two counters (for each storage device 18), which are used in alternating time periods according to the selector indices of the respective time periods. For example, counter 0 is incremented in the time periods in which selector period 0 is active and counter 1 is incremented in the time periods in which selector period 1 is active. The use of counters is described in more detail with reference to FIG. 18.

FIG. 17 shows that a content transfer request 42-1 commences being served by storage device A in time period T1, a content transfer request 42-2 commences being served by storage device C in time period T1, a content transfer request 42-3 commences being served by storage device D in time period T2, a content transfer request 42-4 commences being served by storage device A in time period T2, a content transfer request 42-5 commences being served by storage device B in time period T3, a content transfer request 42-6 commences being served by storage device A in time period T3, a content transfer request 42-7 commences being served by storage device B in time period T3, and a content transfer request 42-8 commences being served by storage device C in time period T4.

Figure 18:
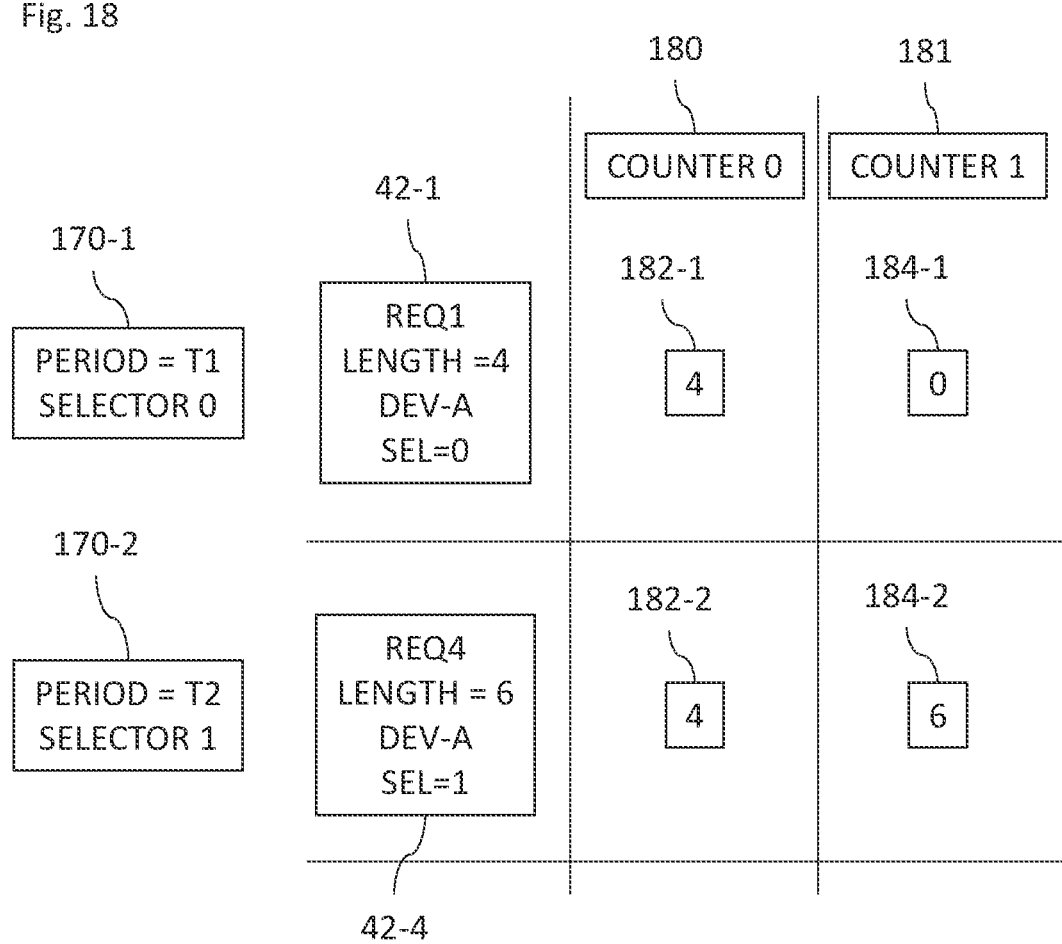
FIG. 18 is a block diagram illustrating finding a malfunctioning storage device using counters in the method of FIG. 13.

Reference is now made to FIG. 18, which is a block diagram illustrating finding a malfunctioning storage device using counters 180, 181 in the method of FIG. 13. Counter 180 is incremented in time periods of selector index 0, and counter 181 is incremented in time periods of selector index 1.

FIG. 18 shows two content transfer requests 42 commencing to be served in time period T1, and time period T2, respectively. In time period T1, the content transfer request 42-1 commences being served by storage device A. The content transfer request 42-1 has an associated data length of 4 which represents the amount of data to be transferred between storage device A and one of the remote devices 16. As the selector index in time period T1 is equal to 0, counter 180 is incremented by 4 (from 0) and now has a value of 4 (block 182-1). Counter 181 has a value equal to 0 (block 184-1) in time period T1. The data length associated with content transfer request 42-1, the ID of the storage device 18, and the selector index in time period 1 are stored as metadata for content transfer request 42-1.

In time period T2, the content transfer request 42-4 commences being served by storage device A. The content transfer request 42-4 has an associated data length of 6 which represents the amount of data to be transferred between storage device A and one of the remote devices 16. As the selector index in time period T2 is equal to 1, counter 181 is incremented by 6 (from 0) and now has a value of 6 (block 184-2). Counter 180 still has a value equal to 4 (block 182-2) in time period T2. The data length associated with content transfer request 42-4, the ID of the storage device 18, and the selector index in time period 2 are stored as metadata for content transfer request 42-4.

When serving content transfer request 42-1 is completed, the metadata for content transfer request 42-1 is retrieved (to identify the counter used to track the content transfer request 42-1 and find the data length associated with the content transfer request 42-1), and counter 180 is decremented by the associated data length of the content transfer request 42-1, i.e., 4. Similarly, when serving content transfer request 42-4 is completed, the metadata for content transfer request 42-4 is retrieved, and counter 181 is decremented by the associated data length of the transfer request 42-4, i.e., 6.

The lengths of the time periods (e.g., T1, T2, etc.) are generally set to be equal to the size of the given timeout used to determine if the storage devices 18 are malfunctioning. The timeout may depend on the storage device performance, and may be a user configurable parameter. The time may depend on worst-case latency experienced by the connected storage devices. Therefore, if storage device A is functioning correctly, it would be expected that counter 180 should return to zero in the time period after which counter 180 was incremented. Similarly, if storage device A is functioning correctly, it would be expected that counter 181 should return to zero in the time period after which counter 181 was incremented. In the example of FIG. 18 it would be expected that counter 180 would return to zero in time period T2.

In the example of FIG. 18, the processing circuitry 24 checks counter 180 towards the end of time period T2, and finds that counter 180 is non-zero. Therefore, processing circuitry 24 determines that storage device A is malfunctioning. The data capacity of storage sub-system 26 currently assigned to storage device A (represented by the value of counter 180 (4 in the example of FIG. 18) plus the value of counter 181 (6 in the example of FIG. 18) is reallocated for use by other storage devices 18.

Figure 19:
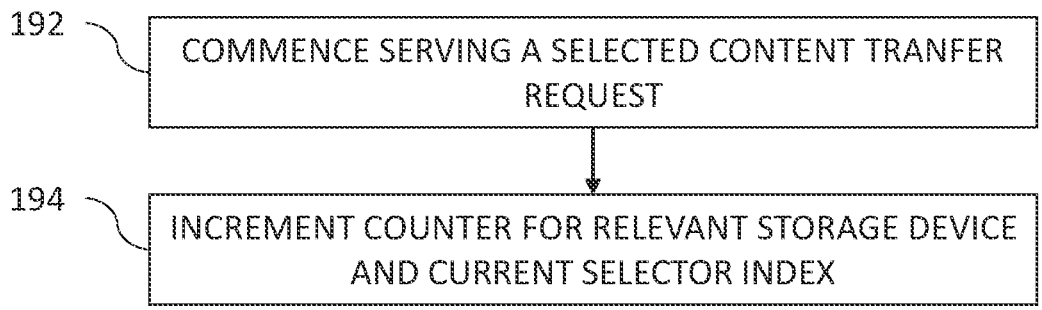
FIG. 19 is a flowchart including steps in a sub-method of the method of FIG. 13 to process serving a new content transfer request including use of a counter.

Reference is now made to FIG. 19, which is a flowchart 190 including steps in a sub-method of the method of FIG. 13 to process serving a new content transfer request 42 including use of counters 180, 181.

The processing circuitry 24 is configured to commence serving (block 192) a selected content transfer request 42 and increment (block 194) one of the counters 180, 181 (depending on the selector index of the time period in which the counter is incremented), responsively to a decision to commence serving the selected content transfer request 42. Counter 180 is incremented in time periods of selector index 0, and counter 181 is incremented in time periods of selector index 1. The counter 180, 181 is advanced in a first direction responsively to a length of a data block associated with the selected content transfer request 42.

Therefore, the processing circuitry 24 is configured to increment different counters 180, 181 for the content transfer requests 42 that commence serving in different time periods associated with different selector indices. The processing circuitry 24 is configured to operate different counters 180, 181 for the content transfer requests 42 of respective different storage devices 18 (malfunctioning and/or correctly functioning storage devices 18). For example, each storage device 18 may be tracked using two counters. For example, storage device A may have two counters (one to be incremented in the time periods of selector index 0, and one to be incremented in the time periods of selector index 1), and storage device B may have two counters (one to be incremented in the time periods of selector index 0, and one to be incremented in the time periods of selector index 1), and so on.

Figure 20:
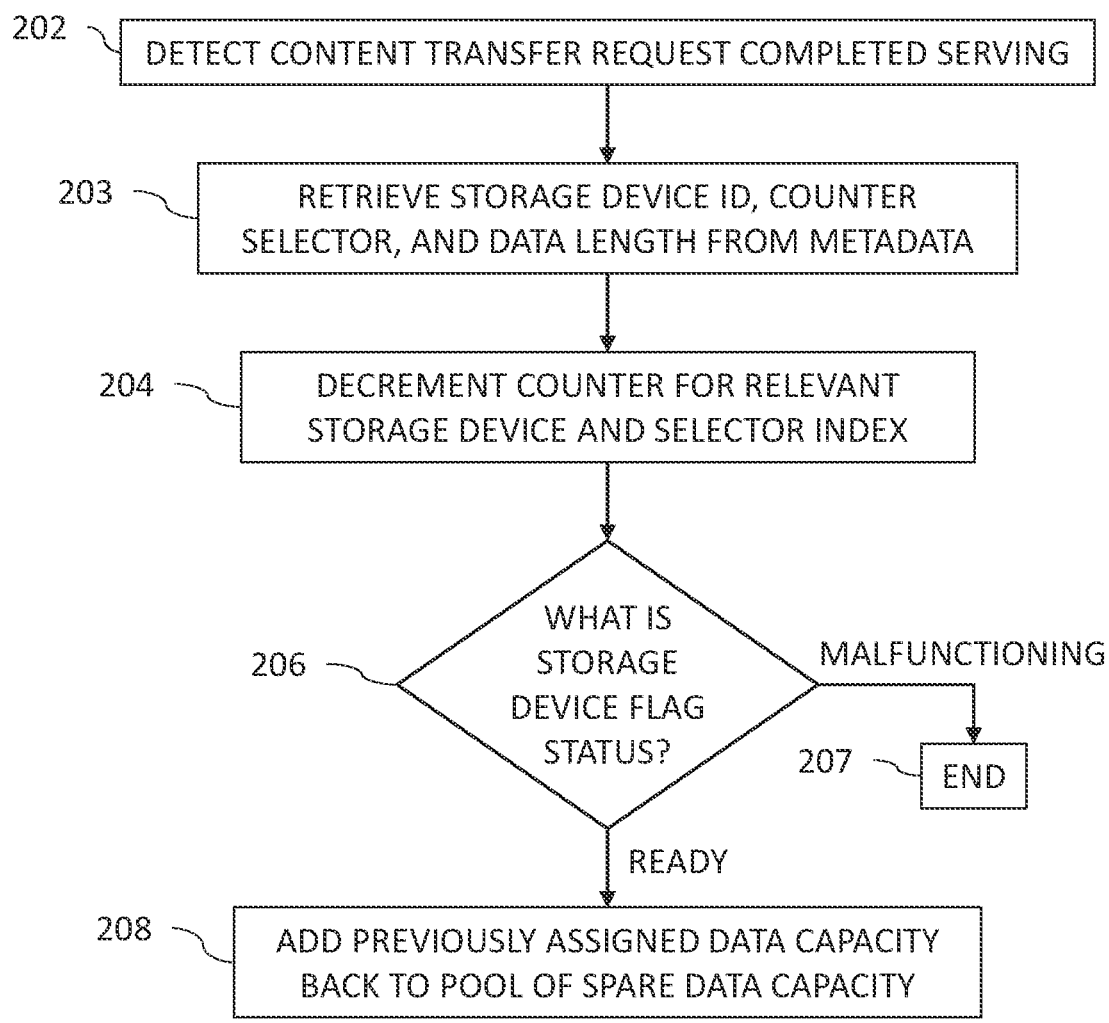
FIG. 20 is a flowchart including steps in a sub-method of the method of FIG. 13 to process completion of serving a content transfer request including use of a counter.

Reference is now made to FIG. 20, which is a flowchart 200 including steps in a sub-method of the method of FIG. 13 to process completion of serving a content transfer request including use of a counter.

The processing circuitry 24 is configured to detect (block 202) that one of the content transfer requests 42 has completed serving by the storage sub-system 26 (e.g., responsively to receiving a completion notification from the storage sub-system 26). The processing circuitry 24 is configured to retrieve (block 203) the storage device ID, the selector index, and the data length from the metadata of the completed content transfer request 42. The processing circuitry 24 is configured to decrement (block 204) the counter (selected from the counter 180 or the counter 181 responsively to the retrieved selector index and the retrieved storage device ID) responsively to completion of serving the content transfer request. The counter is advanced in a second direction (opposite to the first direction used in the step of block 194 of FIG. 19) responsively to the length of the data block (retrieved from the metadata) associated with the completed content transfer request 42.

At a decision block 206, the processing circuitry 24 is configured to check the status flag of the storage device 18 associated with the completed content transfer request 42. If the status flag is equal to "malfunctioning", the sub-method ends (block 207). If the status flag is equal to "ready", the processing circuitry 24 is configured to add (block 208) the data capacity previously assigned to serving the completed content transfer request 42, back to the pool of spare data capacity based on the length of a data block (retrieved from the metadata). For example, if X data-capacity credits 46 were originally assigned to the completed content transfer request 42, the X credits are now added back to the pool of spare data capacity for assignment to other content transfer requests 42 waiting in the pending queue(s) 44.

Reference is now made to FIG. 21, which is a flowchart 210 including steps in a sub-method of the method of FIG. 13 to find a malfunctioning storage device and reallocate the data capacity of the found malfunctioning storage device including using counters 180, 181.

The steps of blocks 212-220, described below, describe the processing circuitry 24 being configured to find that one of the storage devices 18 is malfunctioning and taking longer than a given timeout value to complete serving a selected content transfer request 42 responsively to a value of the counter (counter 180 or counter 181) after a time delay from when the counter was incremented responsively to the decision to commence serving the selected content transfer request 42. The step of block 220, described below, also describes the processing circuitry 24 being configured to find the given data capacity of the cache currently assigned to the malfunctioning storage device 18 for reallocation to other storage devices 18 responsively to a value of the counters 180, 181 operated for the malfunctioning storage device 18.

The steps of blocks 212-230 are now described in more detail.

The steps of blocks 212-230 are generally performed prior to updating the selector index to the next selector index. For example, if the current selector index is equal to 0, then the next selector index will equal 1, and if the current selector index is equal to 1, then the next selector index will equal 0.

The processing circuitry 24 is configured to select one of the storage devices 18 and check (block 212) the counter value of the counter of the selected storage device 18 for the next selector index (i.e., the selector index of the next time period). At a decision block 214, the processing circuitry 24 is configured to determine if the checked counter value (of the counter of the next selector index) is equal to zero. If the checked counter value is not equal to zero (e.g., greater than zero) indicating that the selected storage device 18 is taking longer than the given timeout to complete serving the selected content transfer request(s) 42, the processing circuitry 24 is configured (at a decision block 216) to determine the status of the selected storage device 18. If the status flag of the selected storage device 18 is already equal to "malfunctioning", processing continues with the step of block 220, described below. If the status flag of the selected storage device 18 is equal to "ready", the processing circuitry 24 is configured to change (block 218) the status flag of the selected storage device 18 to indicate that the selected storage device 18 is malfunctioning and reallocate (block 220) the previously assigned data capacity of the storage sub-system 26 currently assigned to the found malfunctioning storage device 18 back to the pool of spare data capacity for use by one or more other storage devices 18 based on the values of both counters 180, 181 of the selected storage device. For example, if the value of counter 180 is equal to 4 and the value of counter 181 is equal to 6, 10 units are reallocated back to the pool of spare data capacity.

Returning to decision block 214, if the checked counter value is equal to zero, the processing circuitry 24 is configured (at a decision block 222) to determine the status of the selected storage device 18. If the status flag of the selected storage device 18 is equal to "ready", processing continues with the step of block 220, described below. If the status flag of the selected storage device 18 is equal to "malfunctioning", the processor is configured (at a decision block 224) to check if the counter for the current selector index is equal to zero. If the value of the counter for the current selector index is not equal to zero, processing continues with the step of block 220, described below. If the value of the counter for the current selector index is equal to zero (along with the value of the counter for the next selector index being equal to zero as determined at the decision block 214), thereby indicating that the selected storage device 18 has started to operate again and has processed any pending content transfer requests 42, the processing circuitry 24 is configured to change (block 226) the status flag of the selected storage device 18 to "ready" indicating that the selected storage device 18 is operating correctly and processing continues with the step of block 220, described below.

At the step of block 220, the processing circuitry 24 is configured to determine if there are more storage devices 18 to be selected for the sub-method of FIG. 21. If there is one or more storage devices 18 to be selected, the processing circuitry 24 is configured to select a next storage device 18 (block 228) and continue processing with the step of block 212. If there are no more storage devices 18 to be selected, the processing circuitry 24 is configured to advance (block 230) the selector index from the current selector index thereby starting the next time period. The sub-method described with reference to FIG. 21 is repeated towards the end of every time period.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A data communication apparatus, comprising:
 a storage sub-system to be connected to storage devices; and
 processing circuitry to:
  manage transfer of content with the storage devices over the storage sub-system responsively to content transfer requests, while pacing commencement of serving of respective ones of the content transfer requests responsively to availability of spare data capacity of the storage sub-system so that while ones of the content transfer requests are being served, other ones of the content transfer requests pending serving are queued in at least one pending queue;
  find a malfunctioning storage device of the storage devices currently assigned a given data capacity of the storage sub-system and currently assigned to serve at least one of the content transfer requests;
  reallocate the given data capacity of the storage sub-system currently assigned to the malfunctioning storage device for use by at least another one of the storage devices while the at least one content transfer request assigned to be served by the malfunctioning storage device is still awaiting completion by the malfunctioning storage device;
  change a status flag to indicate that the malfunctioning storage device is malfunctioning;
  receive a new content transfer request while the status flag indicates that the malfunctioning storage device is malfunctioning; and
  commence serving of the new content transfer request, without first adding the new content transfer request to the at least one pending queue, responsively to there being enough spare data capacity of the storage sub-system to serve the new content transfer request and the new content transfer request not being associated with the malfunctioning storage device.

2. The apparatus according to claim 1, wherein the storage sub-system includes a cache, and the spare data capacity is spare cache capacity.

3. The apparatus according to claim 1, wherein the processing circuitry is configured to find the malfunctioning storage device responsively to the malfunctioning storage device taking longer than a given timeout value to complete serving the at least one content transfer request.

4. The apparatus according to claim 1, wherein the processing circuitry is configured to:
 receive a new content transfer request while the status flag indicates that the malfunctioning storage device is malfunctioning; and
 add the new content transfer request to the at least one pending queue responsively to the new content transfer request being associated with the malfunctioning storage device.

5. A data communication apparatus, comprising:
 a storage sub-system to be connected to storage devices; and
 processing circuitry to:
  manage transfer of content with the storage devices over the storage sub-system responsively to content transfer requests, while pacing commencement of serving of respective ones of the content transfer requests responsively to availability of spare data capacity of the storage sub-system so that while ones of the content transfer requests are being served, other ones of the content transfer requests pending serving are queued in at least one pending queue;
  find a malfunctioning storage device of the storage devices currently assigned a given data capacity of the storage sub-system and currently assigned to serve at least one of the content transfer requests;
  reallocate the given data capacity of the storage sub-system currently assigned to the malfunctioning storage device for use by at least another one of the storage devices while the at least one content transfer request assigned to be served by the malfunctioning storage device is still awaiting completion by the malfunctioning storage device;
  change a status flag to indicate that the malfunctioning storage device is malfunctioning;
  increment a counter responsively to a decision to commence serving a selected one of the content transfer requests, the counter being advanced in a first direction responsively to a length of a data block associated with the selected content transfer request; and
  decrement the counter responsively to completion of serving the selected content transfer request, the counter being advanced in a second direction responsively to a length of a data block associated with the selected content transfer request.

6. The apparatus according to claim 5, wherein the processing circuitry is configured to find that the malfunctioning storage device is malfunctioning and taking longer than a given timeout value to complete serving the selected content transfer request responsively to a value of the counter after a time delay from when the counter was incremented responsively to the decision to commence serving the selected content transfer request.

7. The apparatus according to claim 5, wherein the processing circuitry is configured to operate different counters for the content transfer requests of respective different ones of the storage devices.

8. The apparatus according to claim 7, wherein the processing circuitry is configured to increment different counters for the content transfer requests that commence serving in different time periods.

9. The apparatus according to claim 7, wherein the processing circuitry is configured to:
operate at least one counter for the content transfer requests of the malfunctioning storage device; and
find the given data capacity of the cache currently assigned to the malfunctioning storage device for reallocation to the at least other storage devices responsively to a value of the at least one counter operated for the malfunctioning storage device.

10. A data communication apparatus, comprising:
a storage sub-system to be connected to storage devices; and
processing circuitry to:
assign respective weights to the storage devices; and
manage transfer of content with the storage devices over the storage sub-system responsively to content transfer requests, while pacing commencement of serving of respective ones of the content transfer requests responsively to the respective weights of the storage devices so that while ones of the content transfer requests are being served, other ones of the content transfer requests pending serving are queued in at least one pending queue, wherein the processing circuitry is configured to select the respective content transfer requests for serving by the storage sub-system using a weighted round-robin selection from the at least one pending queue, the weighted round-robin being weighted responsively to the weights of the storage devices to which the content transfer requests are targeted.

11. The apparatus according to claim 10, wherein the processing circuitry is configured to manage transfer of the content with the storage devices over the storage sub-system responsively to the content transfer requests, while pacing commencement of serving of the respective content transfer requests responsively to availability of spare data capacity of the storage sub-system.

12. The apparatus according to claim 11, wherein the storage sub-system includes a cache, and the spare data capacity is spare cache capacity.

13. The apparatus according to claim 10, wherein:
the at least one pending queue includes different storage device specific queues; and
the processing circuitry is configured to:
assign the respective content transfer requests to the different storage device specific queues responsively to the respective storage devices to which the respective content transfer requests are targeted; and
select the respective content transfer requests for serving using a weighted round-robin selection from the storage device specific queues, the weighted round-robin being weighted responsively to the weights of the storage devices.

14. The apparatus according to claim 10, wherein the processing circuitry is configured to assign the respective weights to the storage devices responsively to respective performance of the storage devices.

15. The apparatus according to claim 14, wherein the processing circuitry is configured to: monitor the respective performance of the storage devices; and dynamically update the respective weights assigned to the storage devices responsively to the monitoring.

16. A data communication apparatus, comprising:
a storage sub-system to be connected to storage devices; and
processing circuitry to:
manage transfer of content with the storage devices over the storage sub-system responsively to content transfer requests, while pacing commencement of serving of respective ones of the content transfer requests responsively to availability of spare data capacity of the storage sub-system so that while ones of the content transfer requests are being served, other ones of the content transfer requests pending serving are queued in at least one pending queue;
find a malfunctioning storage device of the storage devices currently assigned a given data capacity of the storage sub-system and currently assigned to serve at least one of the content transfer requests;
reallocate the given data capacity of the storage sub-system currently assigned to the malfunctioning storage device for use by at least another one of the storage devices while the at least one content transfer request assigned to be served by the malfunctioning storage device is still awaiting completion by the malfunctioning storage device;
change a status flag to indicate that the malfunctioning storage device is malfunctioning;
receive a new content transfer request while the status flag indicates that the malfunctioning storage device is malfunctioning; and
add the new content transfer request to the at least one pending queue responsively to the new content transfer request being associated with the malfunctioning storage device.

17. The apparatus according to claim 16, wherein the storage sub-system includes a cache, and the spare data capacity is spare cache capacity.

18. The apparatus according to claim 16, wherein the processing circuitry is configured to find the malfunctioning storage device responsively to the malfunctioning storage device taking longer than a given timeout value to complete serving the at least one content transfer request.

19. The apparatus according to claim 16, wherein the processing circuitry is configured to:
receive a new content transfer request while the status flag indicates that the malfunctioning storage device is malfunctioning; and
commence serving of the new content transfer request, without first adding the new content transfer request to the at least one pending queue, responsively to there being enough spare data capacity of the storage sub-system to serve the new content transfer request and the new content transfer request not being associated with the malfunctioning storage device.

20. The apparatus according to claim 16, wherein the processing circuitry is configured to:
increment a counter responsively to a decision to commence serving a selected one of the content transfer requests, the counter being advanced in a first direction responsively to a length of a data block associated with the selected content transfer request; and
decrement the counter responsively to completion of serving the selected content transfer request, the counter being advanced in a second direction responsively to a length of a data block associated with the selected content transfer request.

* * * * *